United States Patent
Watabe et al.

(10) Patent No.: US 11,334,091 B2
(45) Date of Patent: May 17, 2022

(54) MAP INFORMATION UPDATE SYSTEM

(71) Applicant: Panasonic Corporation, Osaka (JP)

(72) Inventors: Mayu Watabe, Tokyo (JP); Kazunori Yamada, Aichi (JP)

(73) Assignee: Panasonic Corporation, Osaka (JP)

( * ) Notice: Subject to any disclaimer, the term of this patent is extended or adjusted under 35 U.S.C. 154(b) by 346 days.

(21) Appl. No.: 16/398,466

(22) Filed: Apr. 30, 2019

(65) Prior Publication Data
US 2019/0369642 A1 Dec. 5, 2019

(30) Foreign Application Priority Data

Jun. 4, 2018 (JP) .............................. JP2018-106948

(51) Int. Cl.
| | | |
|---|---|---|
| G05B 19/04 | (2006.01) | |
| G05D 1/02 | (2020.01) | |
| G06F 16/23 | (2019.01) | |
| G06F 16/29 | (2019.01) | |

(52) U.S. Cl.
CPC ......... *G05D 1/0289* (2013.01); *G05D 1/0274* (2013.01); *G06F 16/23* (2019.01); *G06F 16/29* (2019.01)

(58) Field of Classification Search
CPC .............. G05D 1/0289; G05D 1/0274; G05D 2201/0211; G05D 1/0297; G05D 1/0291; G06F 16/23; G06F 16/29; G01C 21/206
See application file for complete search history.

(56) References Cited

U.S. PATENT DOCUMENTS

| | | | |
|---|---|---|---|
| 10,376,734 B1 | 8/2019 | Razon | |
| 10,733,866 B2 * | 8/2020 | Rabinowitz | .............. A61H 3/04 |
| 2007/0233403 A1 | 10/2007 | Alwan et al. | |
| 2009/0292458 A1 * | 11/2009 | Nakamura | ....... G08G 1/096827 |
| | | | 701/532 |

(Continued)

FOREIGN PATENT DOCUMENTS

| | | |
|---|---|---|
| EP | 3 205 322 | 8/2017 |
| JP | 2002-263152 | 9/2002 |

(Continued)

OTHER PUBLICATIONS

Office Action dated Apr. 21, 2021 in U.S. Appl. No. 16/401,770.

(Continued)

*Primary Examiner* — Harry Y Oh
(74) *Attorney, Agent, or Firm* — Wenderoth, Lind & Ponack, L.L.P.

(57) ABSTRACT

A map information update system according to the present disclosure includes multiple mobile robots that each acquire information on an intention of a user to move and information on a mobile robot position, one or multiple environment information acquiring robot(s) that each acquire(s) environment information, and a server that updates map information based on the information on the intention of the user to move, the information on the mobile robot position, and the environment information, and each of the multiple mobile robots includes a main body part, a handle part, a detecting part, a moving device, a guide information producing part, a presenting part, a user move intention estimating part, a mobile robot position estimating part, and a communicating part.

15 Claims, 17 Drawing Sheets

(56) References Cited

U.S. PATENT DOCUMENTS

| | | | |
|---|---|---|---|
| 2012/0029696 A1* | 2/2012 | Ota | A61H 3/04 700/250 |
| 2014/0379251 A1* | 12/2014 | Tolstedt | A61H 3/068 701/411 |
| 2015/0197008 A1* | 7/2015 | Yoon | B25J 9/0006 700/250 |
| 2015/0209204 A1* | 7/2015 | Hsu | A61G 5/046 180/19.1 |
| 2016/0078758 A1* | 3/2016 | Basalamah | G08G 1/0141 701/118 |
| 2016/0299509 A1* | 10/2016 | Ueda | G05D 1/0274 |
| 2017/0122749 A1 | 5/2017 | Urano et al. | |
| 2017/0128293 A1* | 5/2017 | Tsusaka | A61G 7/1051 |
| 2017/0128299 A1* | 5/2017 | Tsusaka | A61G 5/14 |
| 2017/0189259 A1* | 7/2017 | Song | A61F 4/00 |
| 2017/0225321 A1* | 8/2017 | Deyle | B25J 9/1679 |
| 2017/0258665 A1* | 9/2017 | Maekawa | B62B 5/00 |
| 2018/0001946 A1* | 1/2018 | Yokoya | A61H 3/04 |
| 2018/0221240 A1* | 8/2018 | Yu | A61H 3/061 |
| 2019/0187723 A1* | 6/2019 | Tao | G01C 21/32 |
| 2020/0085668 A1* | 3/2020 | Yu | A61B 5/112 |

FOREIGN PATENT DOCUMENTS

| | | |
|---|---|---|
| JP | 2008-145383 | 6/2008 |
| JP | 6072934 | 2/2017 |
| JP | 2017-90548 | 5/2017 |
| JP | 2018-382 | 1/2018 |

OTHER PUBLICATIONS

Office Action dated Oct. 7, 2021 in U.S. Appl. No. 16/401,770.
Notice of Reasons for Refusal dated Oct. 12, 2021 in corresponding Japanese Patent Application No. 2018-106948, with English Machine Translation.
Office Action dated Mar. 1, 2022 in U.S. Appl. No. 16/401,770.

* cited by examiner

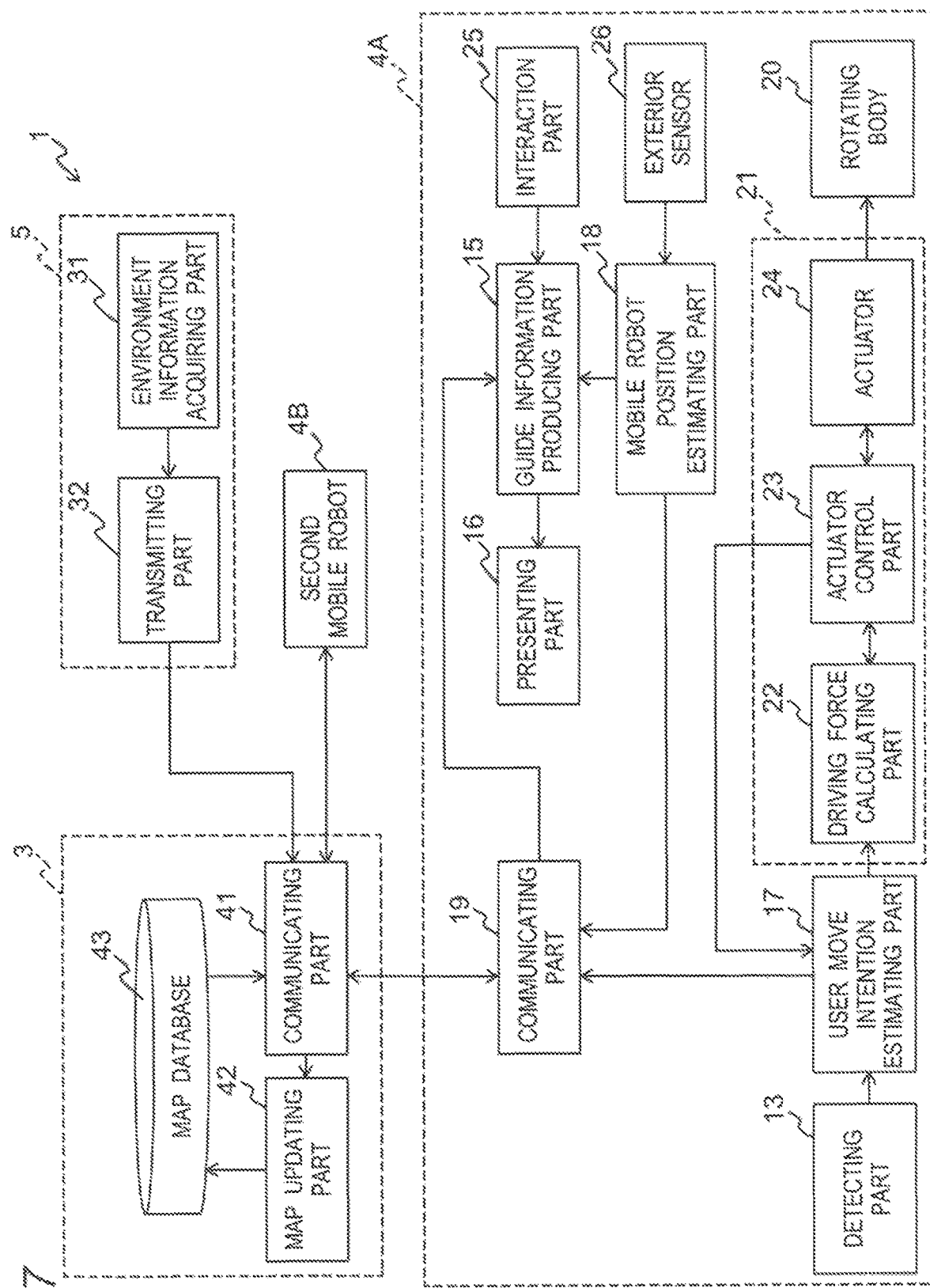

Fig.8

| | | INTENTION OF USER TO MOVE | | | |
| --- | --- | --- | --- | --- | --- |
| | | STOPPING | VELOCITY INCREASE | VELOCITY REDUCTION | ... |
| ENVIRONMENT INFORMATION | OBSTACLE | UPDATE HAZARD DEGREE MAP INFORMATION | | UPDATE HAZARD DEGREE MAP INFORMATION | |
| | STAIN | UPDATE HAZARD DEGREE MAP INFORMATION | | UPDATE HAZARD DEGREE MAP INFORMATION | |
| | INTEREST TARGET | UPDATE CONGESTION DEGREE MAP INFORMATION | | UPDATE CONGESTION DEGREE MAP INFORMATION | |
| | JAMMING OF PEOPLE | UPDATE CONGESTION DEGREE MAP INFORMATION | | UPDATE CONGESTION DEGREE MAP INFORMATION | |
| | TEMPERATURE | | UPDATE COMFORTABLENESS DEGREE MAP INFORMATION | | |
| | HUMIDITY | | UPDATE COMFORTABLENESS DEGREE MAP INFORMATION | | |
| | ILLUMINATION INTENSITY | | | UPDATE COMFORTABLENESS DEGREE MAP INFORMATION | |

Fig. 11

| MAP INFORMATION | | INTENTION OF USER TO MOVE | | | | |
|---|---|---|---|---|---|---|
| | | MILD STOPPING | ABRUPT STOPPING | LEFT TURN OPERATION | RIGHT TURN OPERATION | ... |
| | HAZARD DEGREE MAP INFORMATION | UPDATE USING HAZARD DEGREE AS "INTERMEDIATE" | UPDATE USING HAZARD DEGREE AS "HIGH" | INCREASE HAZARD DEGREE IN RIGHT DIRECTION | INCREASE HAZARD DEGREE IN LEFT DIRECTION | ... |
| | CONGESTION DEGREE MAP INFORMATION | UPDATE USING CONGESTION DEGREE AS "INTERMEDIATE" | UPDATE USING CONGESTION DEGREE AS "HIGH" | INCREASE CONGESTION DEGREE IN RIGHT DIRECTION | INCREASE CONGESTION DEGREE IN LEFT DIRECTION | ... |
| | ... | ... | ... | ... | ... | ... |

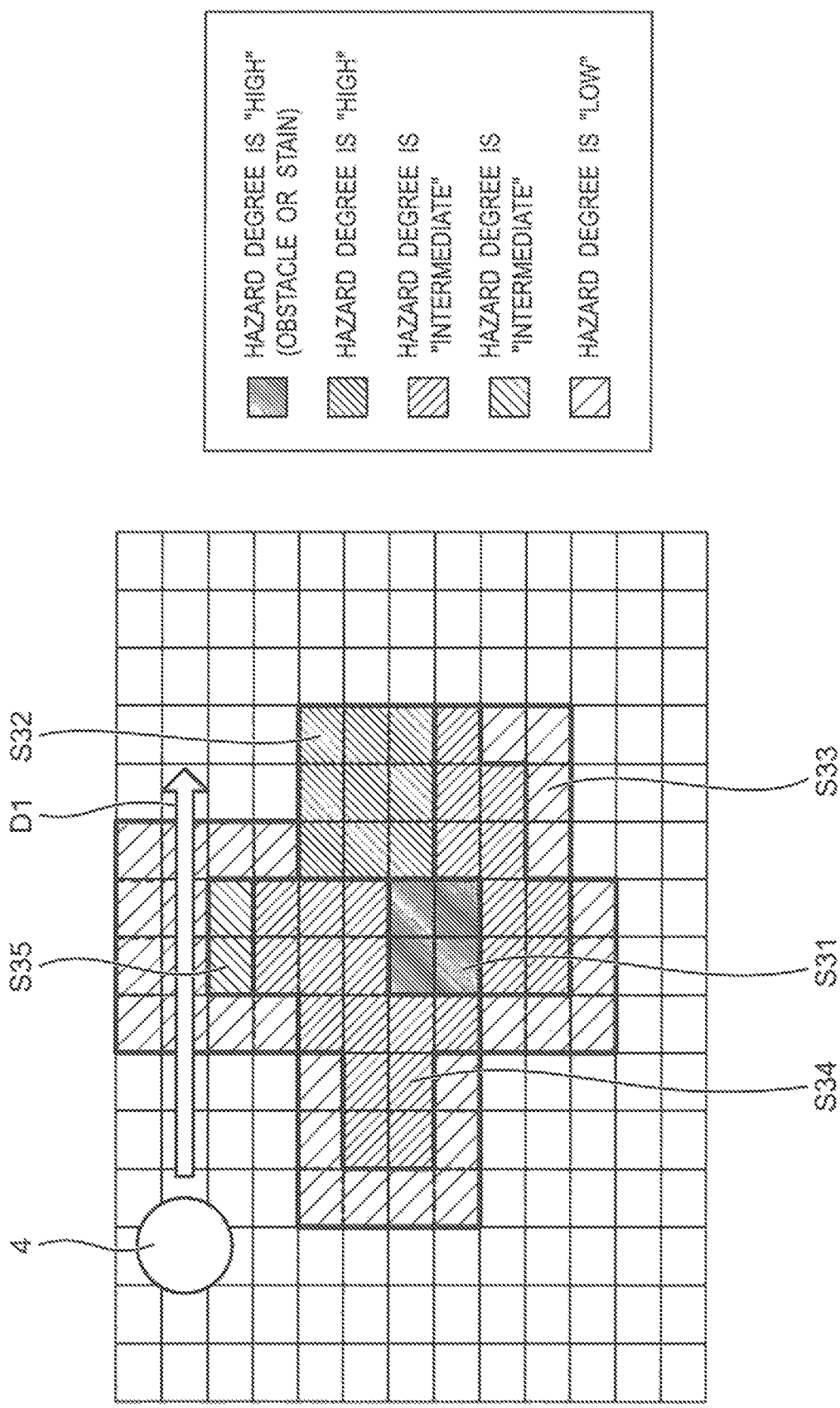

MAP INFORMATION UPDATE SYSTEM

CROSS REFERENCE TO RELATED APPLICATIONS

The present application claims priority to Japanese Patent Application No. 2018-106948 filed Jun. 4, 2018, the entire contents of each of which are incorporated herein by reference.

BACKGROUND OF THE INVENTION

1. Field of the Invention

This disclosure relates to a map information update system that updates map information based on information acquired using multiple robots.

2. Description of the Related Art

Japanese Patent Publication No. 6072934 discloses a mobile robot system capable of distinguishing a place that is highly likely to have a moving object appearing therein in an environment having moving objects such as persons coming and going therein, and efficiently avoiding any collision with any of the moving objects.

For a system that guides a user to a walking route, acquisition of map information capable of safely and comfortably guiding a user has recently been demanded.

SUMMARY OF THE INVENTION

This disclosure solves the problem and provides a map information update system capable of acquiring map information capable of safely and comfortably guiding a user.

A map information update system according to an aspect of this disclosure is a map information update system that updates map information based on information acquired using multiple robots, that includes multiple mobile robots that each guide a user for the user to walk along an optional walking route and that each acquire information on the intention of the user to move and information on the mobile robot position, one or multiple environment information acquiring robot(s) that each acquire(s) environment information of a map, and a server that updates the map information based on the information on the intention of the user to move and the information on the mobile robot position that are acquired by the multiple mobile robots and the environment information that is acquired by the one or multiple environment information acquiring robot(s), and of which each of the multiple mobile robots includes
a main body part,
a handle part that is disposed on the main body part and that can be held by the user,
a detecting part that detects a handle load applied to the handle part,
a moving device that moves the mobile robot based on the handle load applied to the handle part,
a guide information producing part that produces guide information that guiding the user to the walking route based on the map information,
a presenting part that presents presentation information to guide the user based on the guide information,
a user move intention estimating part that estimates the intention of the user to move based on the handle load,
a mobile robot position estimating part that estimates the mobile robot position of the mobile robot, and
a communicating part that transmits the information on the intention of the user to move and the information on the mobile robot position to the server and that receives the map information.

As above, according to the map information update system of this disclosure, the map information capable of safely and comfortably guiding a user can be acquired.

BRIEF DESCRIPTION OF THE DRAWINGS

FIG. 7 is a control block diagram of an example of the main control configuration of the map information update system according to the first embodiment of this disclosure;

FIG. 8 is a diagram of an example of a map update table;

FIG. 11 is a diagram of another example of the map update table;

FIG. 12B is a diagram of an example of an updating process of the hazard degree map information in the case where the user does not vary the move velocity and the move direction of the mobile robot;

Figure 1:
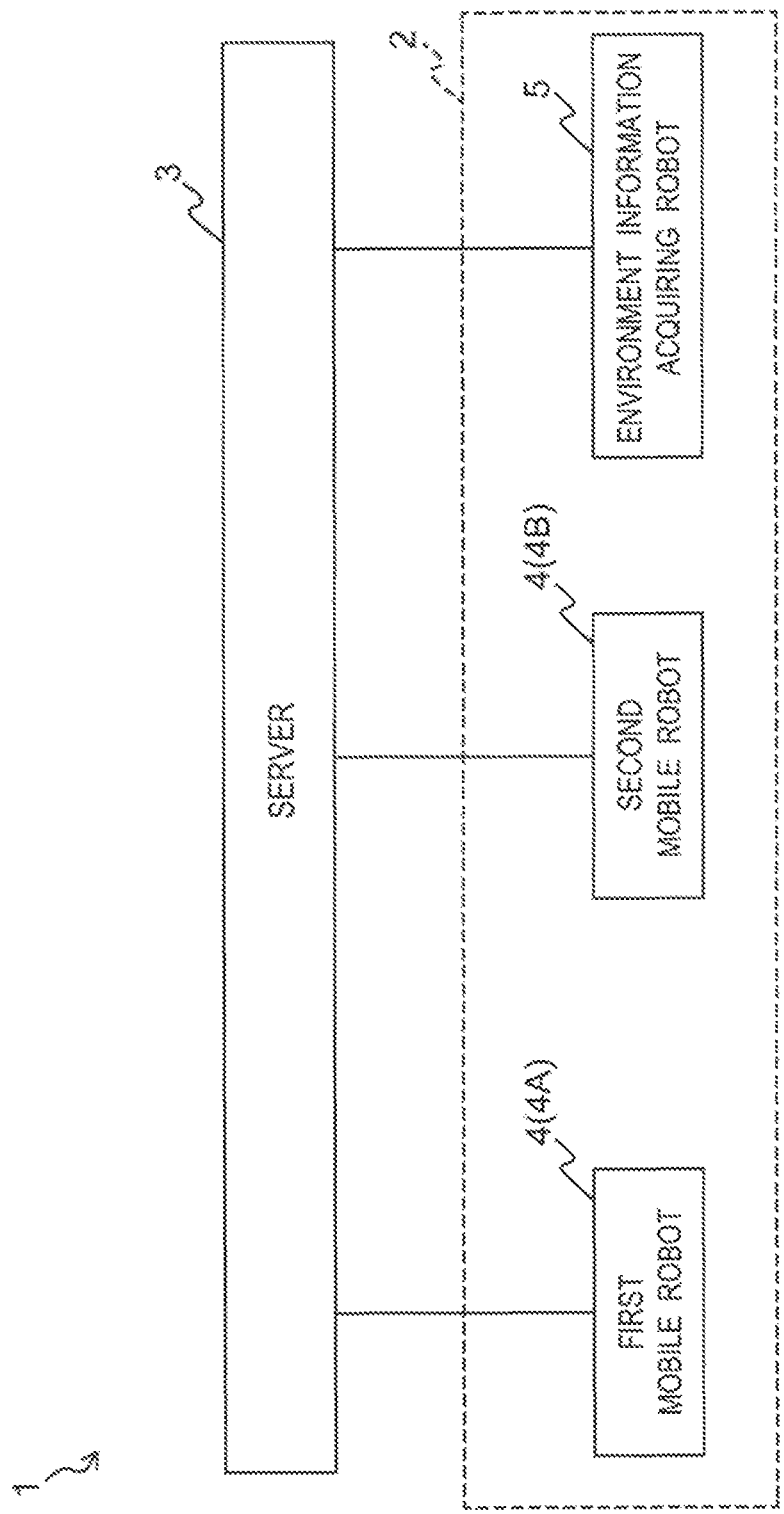
FIG. 1 is a block diagram of an example of a schematic configuration of a map information update system according to a first embodiment of this disclosure.

DESCRIPTION OF THE PREFERRED EMBODIMENTS (Details of Establishing this Disclosure)

For examine, in a system that guides a user using multiple mobile robots as a system guiding the user, a walking route that guides the user to the destination is determined based on man information.

For example, an obstacle, a stain on the ground surface or a wall, congestion of people, or the like may however occur in the path for the user to be able to walk in, that is indicated by the map information. These items each do not always occur and may each occur depending on a temporal factor. In a place having the obstacle, the stain on the ground surface or a wall, the congestion of people, or the like occurring therein, it is difficult for the user to safely and comfortably walk along the walking route. For example, in a place having an obstacle and/or a stain present therein in a walking route, the user needs to detour. Otherwise, in a place having congestion of people occurring therein on the walking route, the walking velocity of the user is reduced and the time period necessary for arriving at the destination becomes longer.

Acquisition of the map information capable of safely and comfortably guiding the user is demanded to the system that guides the user to the walking route using the multiple mobile robots as above. For example, updating of the map information in real time is demanded.

The inventors studied a map information update system that updated the map information based on information acquired using the multiple robots. The inventors found a system that updated the map information based on the information on the intention of the user to move and the information on the mobile robot position that were acquired by the multiple robots and environment information that was acquired by one or multiple environment information acquiring robot(s), and the inventors established the following invention.

A map information update system according to an aspect of this disclosure is a map information update system that updates map information based on information acquired using multiple robots, that includes multiple mobile robots that each guide a user for the user to walk along an optional walking route and that each acquire information on an intention of the user to move and information on the mobile robot position, one or multiple environment information acquiring robot(s) that each acquire(s) environment information of a map, and a server that updates the map information based on the information on the intention of the user to move and the information on the mobile robot position that are acquired by the multiple mobile robots and the environment information that is acquired by the one or multiple environment information acquiring robot(s), and of which each of the multiple mobile robots includes a main body part, a handle part that is disposed on the main body part and that can be held by the user, a detecting part that detects a handle load applied to the handle part, a moving device that moves the mobile robot based on the handle load applied to the handle part, a guide information producing part, that produces guide information guiding the user to the walking route based on the map information, a presenting part that presents the presentation information to guide the user based on the guide information, a user move intention estimating part that estimates the intention of the user to move based on the handle load, a mobile robot position estimating part that estimates the mobile robot position of the mobile robot, and a communicating part that transmits the information on the intention of the user to move and the information on the mobile robot position to the server and that receives the map information.

The map information capable of safely and comfortably guiding the user can be acquired by the above configuration.

The one or multiple environment information acquiring robot(s) may each acquire at Least one piece of information of a hazardous area that blocks the walking of the user, an interest target area having a target present therein that induces interest in a person, and a jamming area having jamming of people occurring therein, as the environment information, and the server may update the map information based on information on the intention of the user to move in the vicinity of at least one area of the hazardous area, the interest target area, and the jamming area.

The map information can be updated based on the information on the intention of the user to move in the vicinity of at least one area of the hazardous area that blocks the walking of the user, the interest target area having an interest target present therein, and the jamming area that has jamming of people occurring therein, by the above configuration. The map information capable of more safely and more comfortably guiding the user can thereby be acquired.

The server may estimate the hazard degree of the vicinity of the hazardous area based or the information on the intention of the user to move in the vicinity of the hazardous area, and may update the map information based on the information on the hazard degree.

The hazard degree of the vicinity of the hazardous area can be estimated and the map information indicating the hazard degree can be updated by the above configuration. The map information capable of more safely and more comfortably guiding the user can thereby be acquired.

The server may estimate the congestion degree of the vicinity of at least one area of the interest target area and the jamming area based on the information on the intention of the user to move in the vicinity of at least one area of the interest target area and the jamming area, and may update the map information based on the information on the congestion degree.

The congestion degree of the vicinity of at least one area of the interest target area and the congestion area can be estimated and the map information can be updated to map information indicating the congestion degree by the above configuration. The map information capable of more safely and more comfortably guiding the user can thereby be acquired.

The server may estimate the position of each of the multiple mobile robots based on the information on the intention of the user to move and the information on the mobile robot position that are acquired by the multiple mobile robots, and may estimate the congestion degree based on the information on the position of each of the multiple mobile robots.

The congestion degree can be estimated based on the information on the position of each of the multiple mobile robots by the above configuration. The congestion degree can thereby be more accurately estimated and the map information capable of more safely and more comfortably guiding the user can thereby be acquired.

Each of the multiple mobile robots may further include
a load tendency data producing part that produces load tendency data indicating the tendency of the handle load applied to the handle part based on the handle load applied to the handle part acquired during the move of the mobile robot, and
a load correcting part that corrects the handle load based on the load tendency data, and
the user move intention estimating part may estimate the intention of the user to move based on the handle load corrected by the load correcting part.

The handle load can be corrected based on the load tendency data and the intention of the user to move can be estimated based on the corrected handle load, by the above configuration. The intention of the user to move can thereby be more correctly estimated and the map information capable of more safely and more comfortably guiding the user can thereby be acquired.

Each of the multiple mobile robots may include an environment information acquiring part that acquires the environment information, and
the server may update the map information based on the environment information acquired by the environment information acquiring parts of the multiple mobile robots.

The environment information can be acquired also by the multiple mobile robots by the above configuration, and the environment information tends to be acquired. The map information capable of more safely and more comfortably guiding the user can thereby be acquired.

The one or multiple environment information acquiring robot(s) may each include the mobile robot.

The map information capable of more safely and more comfortably guiding the user can be acquired by the above configuration.

When the map information is updated, the multiple mobile robots may present information that notifies the user of the fact that the map information is updated using the presenting part.

The user can easily learn that the map information is updated by the above configuration.

The moving device may include a rotating body, and
the user move intention estimating part may estimate the intention of the user to move based on the information on the rotation amount of the rotating body.

The intention of the user to move can be more correctly estimated by the above configuration.

Embodiments of this disclosure will be described below with reference to the accompanying drawings. In the drawings, for simplification of the description, elements are depicted being exaggerated.

First Embodiment

[Overall Configuration]

FIG. 1 is a block diagram of an example of a schematic configuration of a map information update system 1 (hereinafter, referred to as "system 1") according to the first embodiment of this disclosure. As depicted in FIG. 1, the system 1 is a system that updates the map information based on the information acquired using the multiple robots 2. The system 1 includes multiple robots 2, and a server 3 that communicates with the multiple robots 2. The multiple robots 2 each communicate with the server 3 by, for example, radio communication.

The multiple robots 2 include multiple mobile robots 4, and one or multiple environment information acquiring robot(s) 5. The multiple mobile robots 4 are each movable by an input by the user. The multiple mobile robots 4 each guide the user for the user to walk along an optional walking route and each acquire information on the intention of the user to move and information on the mobile robot position. The one or multiple environment information acquiring robot(s) acquire(s) environment information of the map.

The "environment information" includes information on, for example, a hazardous area that blocks the walking of the user, an interest target area having an interest target present therein that induces interest in a person, a jamming area having jamming of people occurring therein, and a comfortable area for a person to be able to comfortably walk in. The hazardous area includes, for example, an area that has an obstacle or a stain present therein. Examples of the interest target include targets that each induce interest in a person such as, for example, a poster, a store, a display, a picture, and scenery. The jamming of people means the state where a flow of people jams due to reduction of the velocity of and/or jamming of moving people. The comfortable area includes an area for the user to comfortably walk in based on the temperature, the humidity, the illumination intensity, and the like. The environment information only has to include at least one of the above pieces of information.

In the first embodiment, the multiple robots 2 will be described taking an example where the multiple robots 2 include a first mobile robot 4A and a second mobile robot 4B as the multiple mobile robots 4. The multiple robots 2 will be described taking an example where the multiple robots 2 include one environment information acquiring robot 5.

The server 3 communicates with the multiple mobile robots 4, and the one or multiple environment information acquiring robot(s) 5 and thereby acquires the information on the intention of the user to move of the multiple mobile robots 4, the information on the mobile robot positions of the multiple mobile robots 4, and the environment information. The server 3 updates the map information based on the information on the intention of the user to move and the information on the mobile robot positions acquired by the multiple mobile robots 4, and the environment information acquired by the one or multiple environment information acquiring robot(s) 5.

The server 3 updates the map information based on the information on the intention of the user to move in the vicinity of at least one area of the hazardous area, the interest target area, the jamming area, and the comfortable area.

The map information includes information that indicates a map of facilities such as, for example, an airport, a mall, a hospital, a library, a museum, and an amusement park. The map information includes, for example, hazard degree map information indicating the hazard degree, congestion degree map information indicating the congestion degree, and comfortableness degree map information indicating the comfortableness. The hazard degree means the likelihood of blocking the walking of the user by, for example, an obstacle or a stain. The congestion degree means, for example, the degree of congestion of people caused by gathering of people to an interest target and/or the degree of congestion of people by a jamming of people. The comfortableness means the degree of coziness felt by a person based on, for example, the temperature, the humidity, and the illumination intensity. The hazard degree map information, the congestion degree map information, and the comfortableness degree map information are each exemplification and the map information is not limited to these pieces of information.

The map information may be produced by month, by day, and by the time of day.

Figure 2:
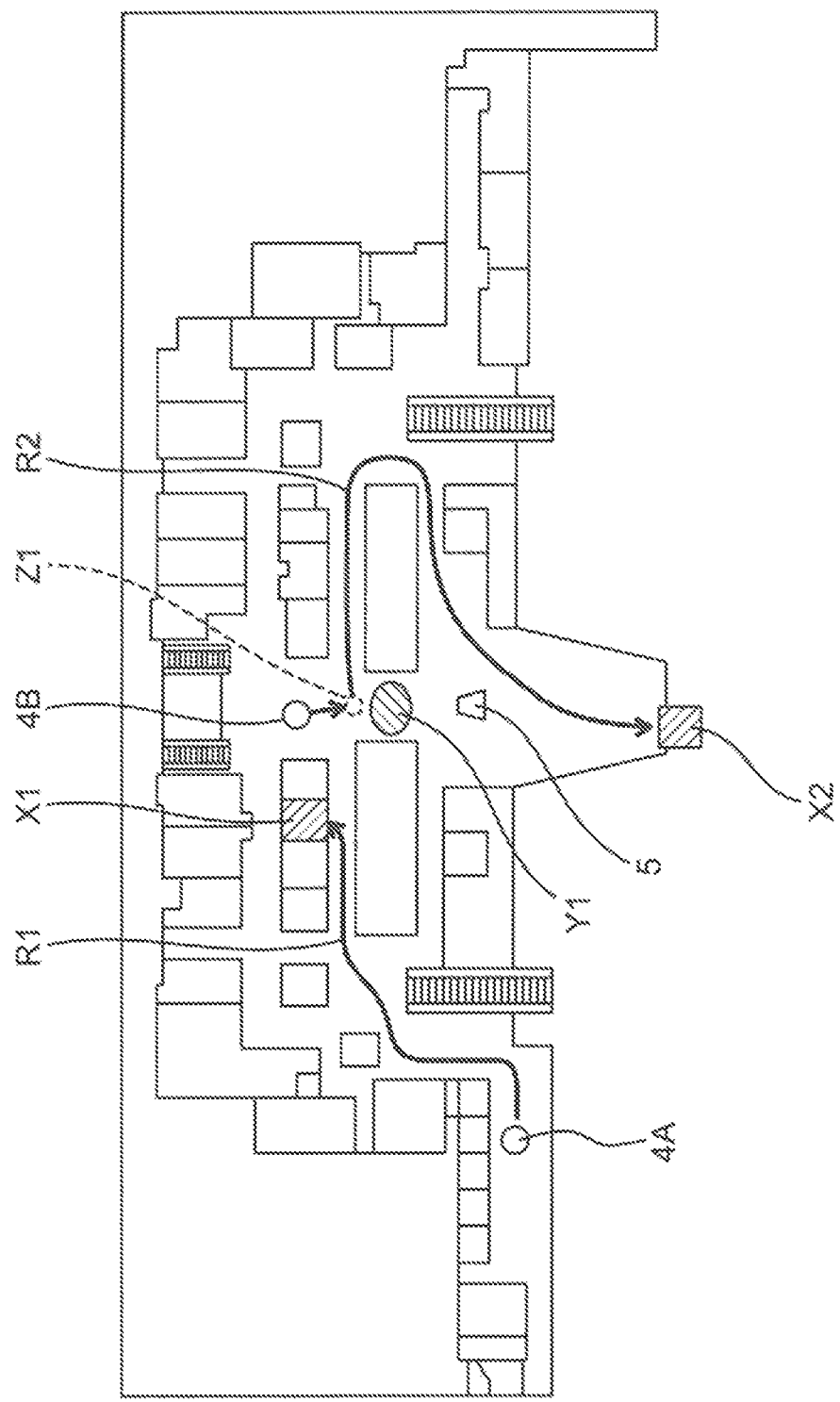
FIG. 2 is a diagram of an example of the state where a user is guided to a walking route using multiple mobile robots in the map information update system according to the first embodiment of this disclosure.

FIG. 2 is a diagram of an example of the state where the user is guided to a destination using the multiple mobile robots 4A and 4B in the system 1. As an example, the map information depicted in FIG. 2 indicates map information on an airport.

An example of the operation of the first mobile robot 4A will be described. The first mobile robot 4A sets a store X1 as where-to-go information. The first mobile robot 4A acquires the map information from the server 3 and determines a first walking route R1 from the starting place to the store X1 based on the map information. For example, a route having the shortest distance from the current location of the user to the store X1 is set as the first walking route R1. The first mobile robot 4A guides the user to walk along the first walking route R1.

An example of the operation of the second mobile robot 4B will be descried. The second mobile robot 4B sets an exit X2 as the where-to-go information. In this case, the environment information acquiring robot 5 already detects the position at which an obstacle Y1 is present in the central portion of the map. The server 3 thereby already acquires the position information on the obstacle Y1 from the environment information acquiring robot 5 and already updates the map information to map information indicating that the obstacle Y1 is present in the central portion of the map. The second mobile robot 4B determines the walking route that avoids the central portion of the map based on the map information acquired from the server 3. The second mobile robot 4B is set to have a route that avoids the first, walking route R1 of the first mobile robot 4A to avoid the congestion. For example, the second mobile robot 48 determines a second walking route R2 that circles in the leftward relative to the travelling direction of the user in the central portion of the map. The second mobile robot 4B guides the user for the user to walk along the second walking route R2.

The server 3 estimates a velocity reduction position and/or a stop position Z1 of the second mobile robot 4B in the vicinity of the obstacle Y1 based on the information on the intention of the user to move and the information on the mobile robot position that are acquired by the second mobile robot 4B and the position information on the obstacle Y1 that is acquired by the environment information acquiring robot 5. The server 3 estimates the hazard degree of the velocity reduction position and/or the stop position Z1. The server 3 updates the map information on the vicinity of the obstacle Y1 based on the estimated hazard degree. Another user guided by another mobile robot 4 can thereby safely and comfortably move when the other user moves in the vicinity of the obstacle Y1.

In this manner, with the system 1, the obstacle Y1 can be avoided and the congestion of people can be avoided. In the system 1, the map information can be updated in real time based on the pieces of information acquired by the multiple mobile robots 4 and the environment information acquiring robot 5. The atlas information can thereby be acquired in real time that can safely and comfortably guide the user. As a result, with the system guiding a user using the multiple mobile robots 4, the user can safely and comfortably be guided to a walking route based on the map information that is updated in real time.

[Mobile Robot]

Figure 3:
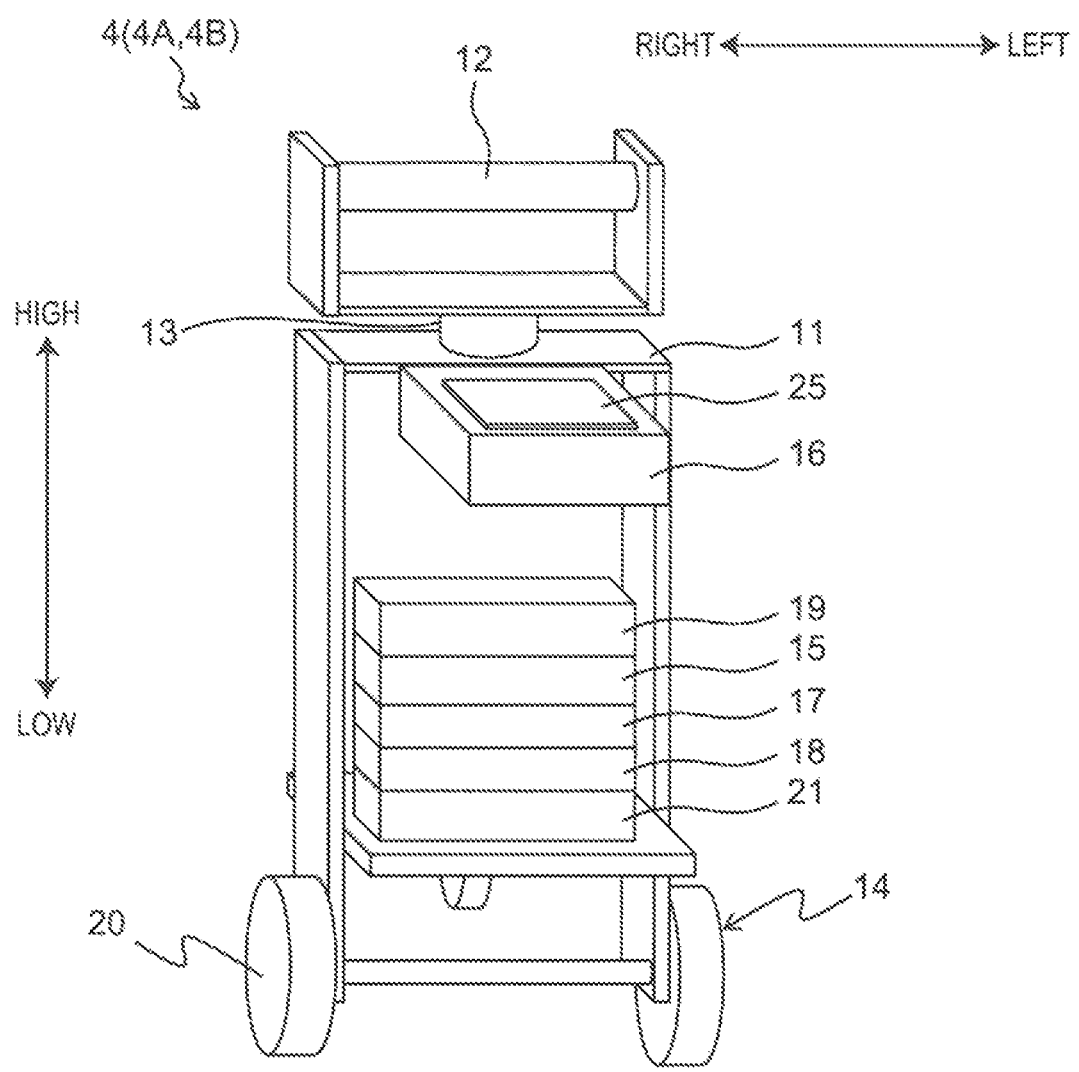
FIG. 3 is a diagram of an outer appearance of an example of the mobile robot in the first embodiment of this disclosure.
Figure 4:
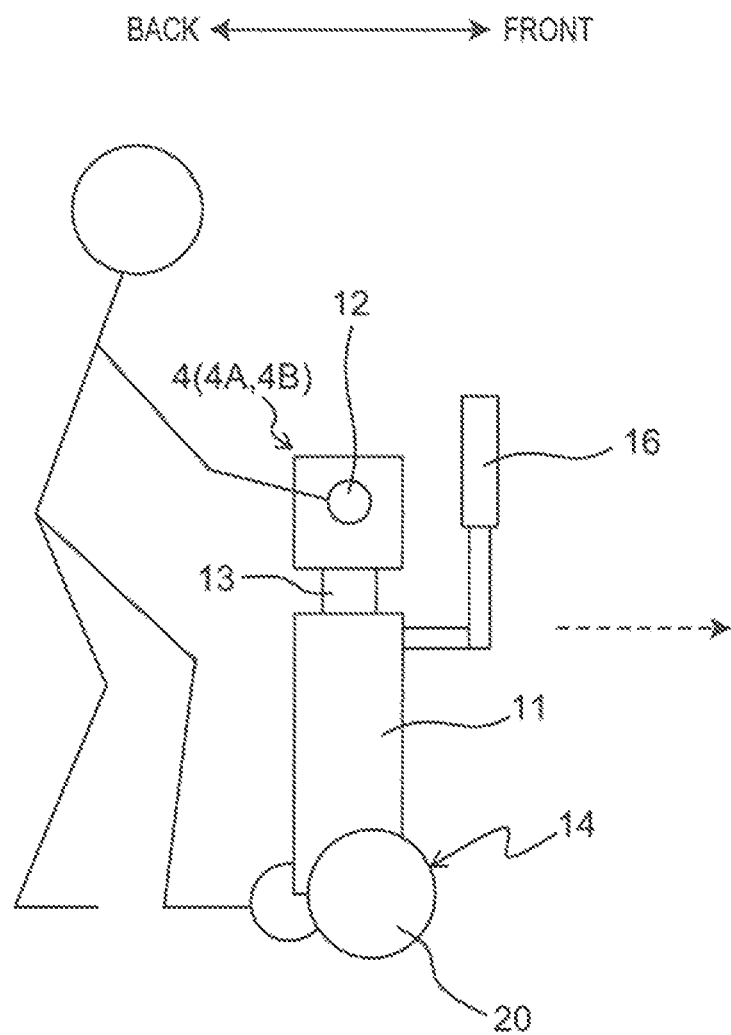
FIG. 4 is a diagram of an example of the state where the user moves receiving the guide by the mobile robot in the first embodiment of this disclosure.

FIG. 3 is a diagram of an outer appearance of an example of the mobile robot 4. FIG. 4 is a diagram of an example of the state where the user moves receiving the guiding by the mobile robot 4. As depicted in FIG. 3 and FIG. 4, the mobile robot 4 includes a main body part 11, a handle part 12, a detecting part 13, a moving device 14, a guide information producing part 15, a presenting part 16, a user move intention estimating part 17, a mobile robot position estimating part 18, and a communicating part 19.

The mobile robot 4 guides the user to the destination along the walking route. For example, the mobile robot 4 calculates the walking route from the where-to-go information, the mobile robot position information, and the map information, presents a sound, an image, and/or a video image for the user to walk along the calculated walking route, and thereby guides the user. The "walking route" as used herein means a path for the user to walk in from the starting place to the destination.

The move of the mobile robot 4 is executed based on an input by the user. For example, the mobile robot 4 estimates the move direction and the move velocity of the user based on the input by the user, and supports the user for the user to be able to stably walk. In the first embodiment, the input by the user is a load applied to the handle part 12 (a handle load) and is detected by the detecting part 13.

The main body part 11 includes, for example, a frame that has stiffness capable of supporting the other constituent members and supporting the load applied when the user walks.

The handle part 12 is disposed in the upper portion of the main body part 11 and is disposed to have a shape, at a height, and at a position to be easily held by the user with both hands during the walking.

The detecting part 13 detects the handle load applied by the user to the handle part 12 by being held by the user. For example, when the user walks holding the handle part 12, the user applies the handle load to the handle part 12. The detecting part 13 detects the direction and the magnitude of the handle load applied by the user to the handle part 12.

Figure 5:
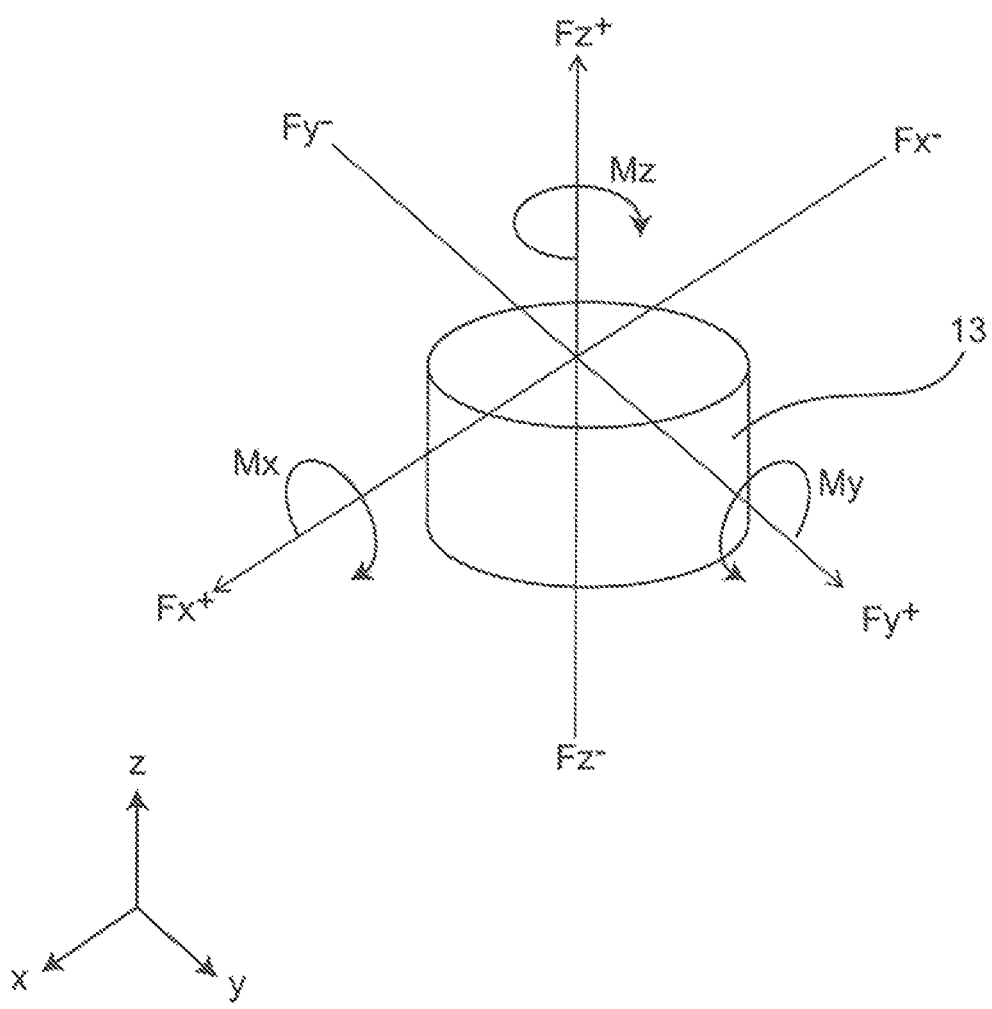
FIG. 5 is a diagram of an example of detecting directions of the handle load detected by a detecting part in the first embodiment of this disclosure.

FIG. 5 depicts an example of detecting directions of the handle load detected by the detecting part 13. As depicted in FIG. 5, the detecting part 13 is a hexaxial force sensor capable of detecting both of forces applied in the directions of three axes each intersecting with each other at a right angle, and moments around axes of the three axes. The three axes each intersecting with each other at a right angle are an x-axis extending in the right-and-left direction of the mobile robot 4, a y-axis extending in the front-and-back direction of the mobile robot 4, and a z-axis extending in the height direction of the mobile robot 4. The forces applied in the directions of the three axes are a force Fx applied in the x-axis direction, a force Fy applied in the y-axis direction, and a force Fz applied in the z-axis direction. In the first embodiment, a force applied in the rightward direction of Fx is denoted by "$Fx^+$", and a force applied in the leftward direction thereof is denoted by "$Fx^-$". A force applied in the forward direction of Fy is denoted by "$Fy^+$", and a force applied in the backward direction thereof is denoted by "$Fy^-$". A force applied in the vertically upward direction relative to the plane for the walking of the Fz direction is denoted by "$Fz^+$", and a force applied in the vertically downward direction relative to the plane for the walking thereof is denoted by "$Fz^-$". The moments around axes of the three axes are a moment Mx around the axis of the x-axis, a moment My around the axis of the y-axis, and a moment Mz around the axis of the z-axis.

The moving device 14 moves the main body part 11. The moving device 14 moves the main body part 11 based on the magnitude and the direction of the handle load (the forces and the moments) detected by the detecting part 13. In the first embodiment, the moving device 14 executes the following control. Each of Fx, Fy, Fz, Mx, My, and Mz may be referred to as "load" herein.

<Forward Motion>

When the detecting part 13 detects the force of $Fy^+$, the moving device 14 moves the main body part 11 in the forward direction. When the detecting part 13 detects the force of $Fy^+$, the mobile robot 4 executes a forward motion. In the time period for the mobile robot 4 to execute the forward motion, when the force of $Fy^+$ detected by the detecting part 13 is enhanced, the moving device 14 increases the velocity of the move in the forward direction of the mobile robot 4. On the ocher hand, in the time period for the mobile robot 4 to execute the forward motion, when the force of $Fy^+$ detected by the detecting part 13 is weakened, the moving device 14 reduces the velocity of the move in the forward direction of the mobile robot 4.

<Backward Motion>

When the detecting part 13 detects the force of $Fy^-$, the moving device 14 moves the main body part 11 in the backward direction. When the detecting part 13 detects the force of $Fy^-$, the mobile robot 4 executes a backward motion. In the time period for the mobile robot 4 to execute the backward motion, when the force of $Fy^-$ detected by the detecting part 13 is enhanced, the moving device 14 increases the velocity of the move in the backward direction of the mobile robot 4. On the other hand, in the time period for the mobile robot 4 to execute the backward motion, when the force of $Fy^-$ detected by the detecting part 13 is weakened, the moving device 14 reduces the velocity of the move in the backward direction of the mobile robot 4.

<Right Turning Motion>

When the detecting part 13 detects the force of $Fy^+$ and the moment of $Mz^+$, the moving device 14 moves the main body part 11 to turn in the rightward direction. When the detecting part 13 detects the force of $Fy^+$ and the moment of $Mz^+$, the mobile robot 4 executes a right turning motion. In the time period for the mobile robot 4 to execute the right turning motion, when the moment of $Mz^+$ detected by the detecting part 13 is enhanced, the turn radius of the mobile robot 4 is reduced. In the time period for the mobile robot 4 to execute the right turning motion, when the force of $Fy^+$ detected by the detecting part 13 is enhanced, the turn velocity is increased.

<Left Turning Motion>

When the detecting part 13 detects the force of $Fy^+$ and the moment of $Mz^-$, the moving device 14 moves the main body part 11 to turn in the leftward direction. When the detecting part 13 detects the force of $Fy^+$ and the moment of $Mz^-$, the mobile robot 4 executes a left turning motion. In the time period for the mobile robot 4 to execute the left turning motion, when the moment of $Mz^-$ detected by the detecting part 13 is enhanced, the turn radius of the mobile robot 4 is reduced. In the time period for the mobile robot 4 to execute the left turning motion, when the force of $Fy^+$ detected by the detecting part 13 is enhanced, the turn velocity is increased.

The control for the moving device 14 is not limited to the above example. The moving device 14 may control the forward motion and the backward motion based on, for example, the forces of Fy and Fz. The moving device 14 may control the turn operations of the mobile robot 4 based on, for example, the moment of Mx or My.

The handle load used to calculate the move velocity may be the load in the forward direction ($Fy^+$) or the load in the downward direction ($Fz^-$), or a load formed by combining the load in the forward direction ($Fy^+$) and the load in the downward direction ($Fz^-$).

The moving device 14 includes a rotating body 20 disposed in the lower portion of the main body part 11, and a driving part 21 that drives and controls the rotating body 20.

The rotating body 20 supports the main body part 11 in the state where the main body part 11 is caused to independently stand, and is a wheel rotated and driven by the driving part 21. In the first embodiment, the two rotating bodies 20 are rotated by the driving part 21 and the mobile robot 4 is thereby moved. For example, in the state where the posture of the mobile robot 4 that is caused to independently stand is maintained, the rotating bodies 20 move the main body part 11 in the direction of an arrow depicted in FIG. 4 (the forward direction or the backward direction). The example where the moving device 14 includes the move mechanism that uses the two wheels as the rotating bodies 20 has been described in the first embodiment while the configuration is not limited to the above. The rotating body 20 may be, for example, a travelling belt or a roller. The two or more rotating bodies 20 may be used.

The driving part 21 drives the rotating bodies 20 based on the handle load detected by the detecting part 13.

The guide information producing part 15 produces the guide information that guides the user along the walking route. In the first embodiment, the guide information is information to guide the user and includes information on the guide direction The guide information may include information such as the guide velocity, the guide distance, the mobile robot position, the map, and the walking route, in addition to the guide direction.

The presenting part 16 presents presentation information that guides the user, based on the guide information produced by the guide information producing part 15. The presentation information herein is information to guide the user and includes information such as, for example, a sound, an image, and/or a video image. Examples of the presenting part 16 include, for example, a speaker and/or a display.

The user move intention estimating part 17 estimates the intention of the user to move based on the information on the handle load detected by the detecting part 13. The intention of the user to move includes the move direction and the move velocity of the user. For example, the intention of the user to move includes the forward motion, the backward motion, the right turning motion, the left turning motion, the stopping, the velocity reduction, and the like. In the first embodiment, the user move intention estimating part 17 estimates the inclination of the body of the user based on the information on the handle load.

In the first embodiment, the user move intention estimating part 17 estimates the intention of the user to move from the value of the handle load in each of the move directions detected by the detecting part 13. For example, when the force of $Fy^+$ detected by the detecting part 13 has a value equal to or larger than a predetermined first threshold value and the force of $My^+$ detected thereby has a value smaller than a predetermined second threshold value, the user move intention estimating part 17 may estimate that the intention of the user to move is a straight-line travelling operation. The user move intention estimating part 17 may estimate the move velocity based on the value of the handle load in the Fz direction. On the other hand, when the force of $Fy^+$ detected by the detecting part 13 has a value equal to or larger than a predetermined third threshold value and the force of My+ detected thereby has a value equal to or larger than the predetermined second threshold value, the user move intention estimating part 17 may estimate that the intention of the user to move is the right turning motion. The user move intention estimating part 17 may estimate the turn velocity based on the value of the handle load in the Fz direction, and may estimate the turn radius based on the handle load in the My direction.

In the first embodiment, the user move intention estimating part 17 can also estimate the move distance based on the information on the handle load. For example, the move distance can be estimated based on the time period during which the handle load is applied in the move direction, and the move velocity.

The mobile robot position estimating part 18 estimates the mobile robot position of the mobile robot 4. The mobile robot position estimating part 18 estimates the mobile robot position based on the information acquired by, for example, an exterior sensor.

The communicating part 19 transmits the information on the intention of the user to move and the information on the mobile robot position, to the server 3 and receives the map information. The communicating part 19 communicates with the server 3 by, for example, radio communication.

Figure 6:
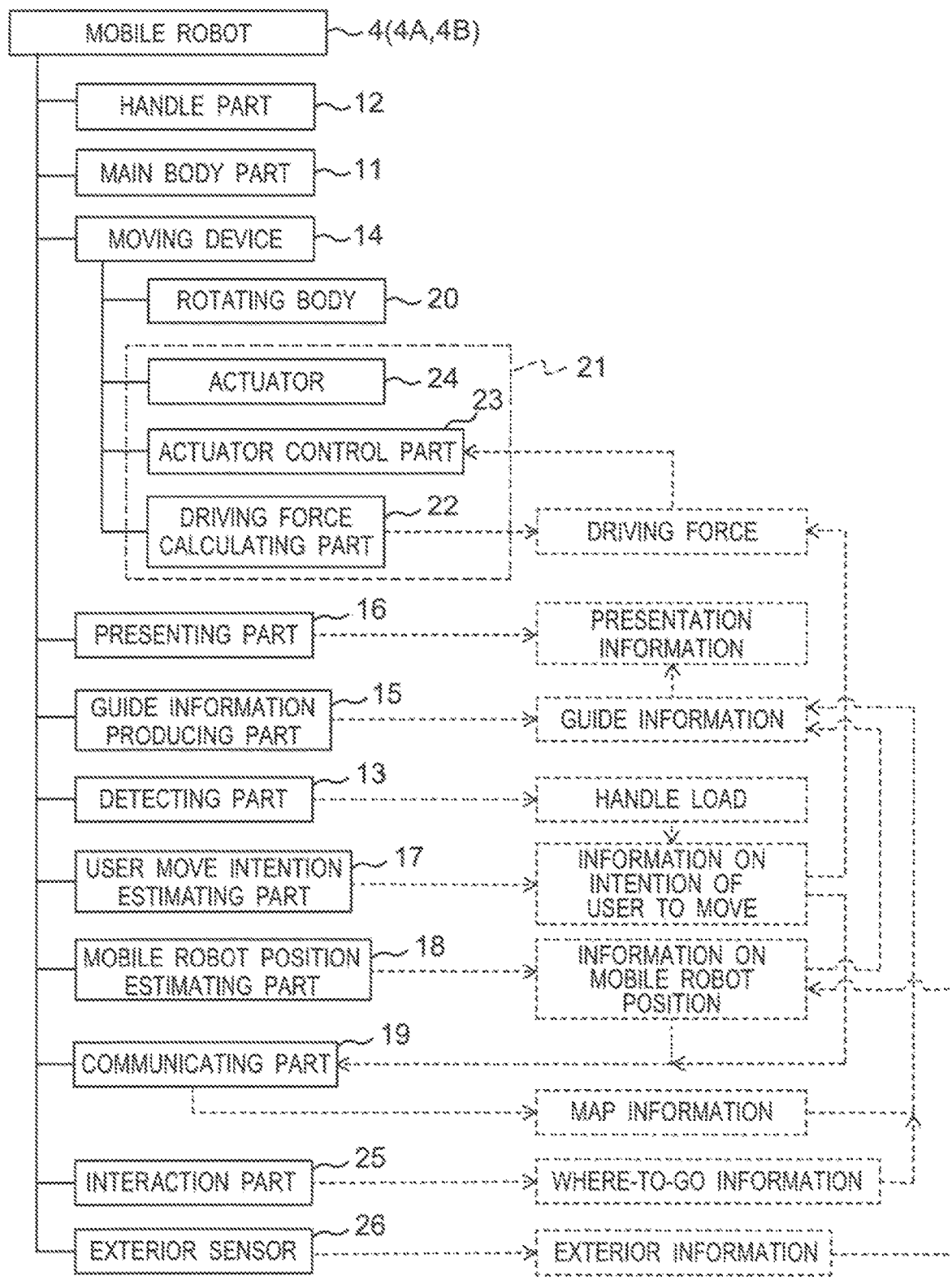
FIG. 6 is a control block diagram of an example of a control configuration of the mobile robot in the first embodiment of this disclosure.

FIG. 6 is a control block diagram of an example of the control configuration of the mobile robot 4. The control block diagram of FIG. 6 also depicts the relation between each control configuration and the information handled thereby.

As depicted in FIG. 6, the detecting part 13 detects the handle load applied to the handle part 12. The information on the handle load detected by the detecting part 13 is transmitted to the user move Intention estimating part 17.

The user move intention estimating part 17 estimates the intention of the user to move (the move direction and the move velocity) based on the information on the handle load detected by the detecting part 13. The information on the estimated intention of the user to move is transmitted to the driving part 21.

The driving part 21 includes a driving force calculating part 22, an actuator control part 23, and an actuator 24. The driving part 21 controls the driving of the rotating body 20 based on the information on the intention of the user to move.

The driving force calculating part 22 calculates the driving force based on the intention of the user to move estimated by the user move intention estimating part 17. For example, when the intention of the user to move is the forward motion or the backward motion, the driving force calculating part 22 calculates the driving forces such that the rotation amounts of the two wheels (the rotating bodies) 20 are even. When the intention of the user to move is the right turning motion, the driving force calculating part 22 calculates the driving forces such that the rotation amount of the right-side wheel 20 of the two wheels 20 is larger than the rotation amount of the left-side wheel 20. The driving force calculating part 22 calculates the magnitude of the driving force in accordance with the move velocity of the user. For example, when the move velocity of the user is increased, the rotation amounts of the rotating bodies 20 are increased. Otherwise, when the move velocity of the user is reduced, the rotation amounts of the rotating bodies 20 are reduced. The information on the calculated driving forces is transmitted to the actuator control part 23.

The actuator control part 23 executes driving and control for the actuator 24 based on the information on the driving force calculated by the driving force calculating part 22. The actuator control part 23 may acquire the information on the rotation amounts of the wheels 20 from the actuator 24 and may transmit the information on the rotation amounts of the wheels 20 to the driving force calculating part 22.

The actuator control part 23 may transmit the information on the rotation amounts of the wheels 20 acquired from the actuator 24, to the user move intention estimating part 17. The user move intent ion estimating part 17 may estimate the intention of the user to move based on the information on the rotation amounts of the wheels 20.

The actuator 24 is, for example, a motor or the like that rotates and drives the wheels 20. The actuator 24 is connected to the wheels 20 through a gear mechanism, a pulley mechanism, or the like. The actuator 24 is driven and controlled by the actuator control part 23 and thereby rotates and drives the wheels 20.

The guide information producing part 15 will be descried. The guide information producing part 15 produces the guide information that guides the user to the walking route, based on the where-to-go information, the map information, and the information on the mobile robot position of the mobile robot 4.

The where-to-go information is input from the user using an interaction part 25. The interaction part 25 is a device used by the user to input the where-to-go information such as the destination, and includes, for example, a sound input device and a touch panel.

The map information is acquired from, for example, the server 3 through the communicating part 19. The map information may be stored in, for example, a storage part (not depicted) of the mobile robot 4. The map information stored in the storage part of the mobile robot 4 may be updated based on the map information acquired from the server 3.

The information on the mobile robot position of the mobile robot 4 is acquired by the mobile robot position estimating part 18. The mobile robot position estimating part 18 estimates the mobile robot position of the mobile robot 4 based on, for example, exterior information acquired by an exterior sensor 26. The exterior information means the information on the vicinity of the mobile robot 4.

The exterior sensor 26 is a sensor that acquires the exterior information for the mobile robot 4. The exterior sensor 26 may include, for example, a sensor such as a distance sensor, a laser range finder (LRF), a laser imaging detection and ranging (LIDAR), a camera, a depth camera, a stereo camera, a sonar, or an RADAR, a global positioning system (GPS), or a combination of some of these.

As above, the guide information producing part 15 produces the guide information based on the where-to-go information acquired by the interaction part 25, the map information acquired from the server 3 through the communicating part 19, and the information on the mobile robot position acquired from the mobile robot position estimating part 18. The produced guide information is transmitted to the presenting part 16.

The presenting part 16 presents the presentation information to guide the user along the walking route, based on the guide information. For example, the presenting part 16 presents the guide direction and/or the walking route using a sound, an image, a video image, and/or the like, and thereby guides the user along the walking route to the destination.

The mobile robot 4 transmits the information on the intention of the user to move and the information on the mobile robot position to the server 3 through the communicating part 19.

FIG. 7 is a control block diagram of an example of the main control configuration of the system 1. In FIG. 7, the control configuration of the second mobile robot 4B is not depicted because the second mobile robot 4B has the same control configuration as that of the first mobile robot 4A.

<Environment Information Acquiring Robot>

As depicted in FIG. 7, the environment information acquiring robot 5 includes an environment, information acquiring part 31 that acquires the environment information, and a transmitting part 32 that transmits the environment information to the server 3. In the first embodiment, the environment information acquiring robot 5 is a robot that moves along the walking route and that acquires the environment information. For example, the environment information acquiring robot 5 may be a cleaning robot, a transporting robot, or the like.

The environment information acquiring part 31 acquires the environment information on the vicinity of the environment information acquiring robot 5. The environment information acquiring part 31 includes, for example, an obstacle detecting part, a stain detecting part, a temperature detecting part, a humidity detecting part, and an illumination intensity detecting part. The obstacle detecting part detects an obstacle on the map. The stain detecting part detects a stain on the ground surface and/or a wall. The temperature detecting part detects the temperature. The humidity detecting part detects the humidity. The illumination intensity detecting part detects the illumination intensity.

The environment information acquiring part 31 may include, for example, a sensor such as a distance sensor, an LRF, an LIDAR, a camera, a depth camera, a stereo camera, a sonar, or an RADAR, the GPS, or a combination of some of these.

The communicating part 32 transmits the environment information acquired by the environment information acquiring part 31 to the server 3.

<Server>

The server 3 includes a communicating part 41 that communicates with the first mobile robot 4A, the second mobile robot 4B, and the environment information acquiring robot 5, a map updating part 42 that updates the map information, and a map database 43 that has the map information stored therein. In the first embodiment, the server 3 is constituted by, for example, a computer that includes a processor and a memory.

The communicating part 41 executes transmission and reception of information by radio communication to/from the first mobile robot 4A, the second mobile robot 4B, and the environment information acquiring robot 5. The communicating part 41 receives the information on the intention of the user to move and the information on the mobile robot position that are acquired by the first mobile robot 4A and the second mobile robot 4B. The communicating part 41 receives the environment information acquired by the environment information acquiring robot 5. The communicating part 41 acquires the map information from the map database 43 and transmits the map information to the first mobile robot 4A and the second mobile robot 4B.

In the first embodiment, the communicating part 41 receives in real time the information on the intention of the user to move and the information on the mobile robot position of the mobile robot 4, and the environment information. For example, the information on the intention of the user to move and the information on the mobile robot position may be transmitted to the communicating part 41 when the mobile robot 4 acquires these pieces of information. Otherwise, the information on the intention of the user to move and the mobile robot position information may be transmitted to the communicating part 41 at a constant cycle. Similarly, the environment information may also be transmitted to the communicating part 41 when the environment information acquiring robot 5 acquires the environment information, or may be transmitted to the communicating part 41 at a constant cycle.

The map updating part 42 acquires the information on the intention of the user to move and the information on the mobile robot position of each of the first mobile robot 4A and the second mobile robot 4B and the environment information of the environment information acquiring robot 5 through the communicating part 41. The map updating part 42 updates the map information based on the information on the intention of the user to move and the information on the mobile robot position that are acquired by each of the first mobile robot 4A and the second mobile robot 4B and the environment information acquired by the environment information acquiring robot 5.

The map updating part 42 updates the map information based on a map update table that correlates, for example, the environment information and the information on the intention of the user to move with each other.

FIG. 8 depicts an example of the map update table. As depicted in FIG. 8, when the information on the hazardous area having an obstacle or a stain present therein is acquired as the environment information and the intention of the user to move in the vicinity of the hazardous area is the stopping or the velocity reduction, the map updating part 42 may update the hazard degree map information. When the information on the interest target area having an interest target present therein is acquired as the environment information and the intention of the user to move in the vicinity of the interest target area is the stopping or the velocity reduction, the map updating part 42 may update the congestion degree map information. When the information on the jamming area having jamming of people occurring therein is acquired as the environment information and the intention of the user to move in the vicinity of the jamming area is the stopping or the velocity reduction, the map updating part 42 may update the congestion degree map information The map updating part 42 may update the comfortableness degree map information based on the information on the temperature, the humidity, or the illumination intensity and the intention of the user to move.

An example where the hazard degree map information is updated will be described as an example of the updating of the map information. In this example, a process of updating the hazard degree map information when the information on the area having an obstacle or a stain present therein is acquired as the environment information, will be described.

The map updating part 42 causes the map information to reflect the area having an obstacle, a stain, or the like present therein as a hazardous area that blocks the walking of the user. The map updating part 42 estimates that the mobile robot 4 moves in the vicinity of the hazardous area, based on the information on the mobile robot position of the mobile robot 4. The map updating part 42 estimates the hazard degree of the vicinity of the hazardous area based on the information on the intention of the user to move of the mobile robot 4 in the vicinity of the hazardous area. The map updating part 42 updates the hazard degree map information based on the hazard degree of the vicinity of the hazardous area.

Figure 9:
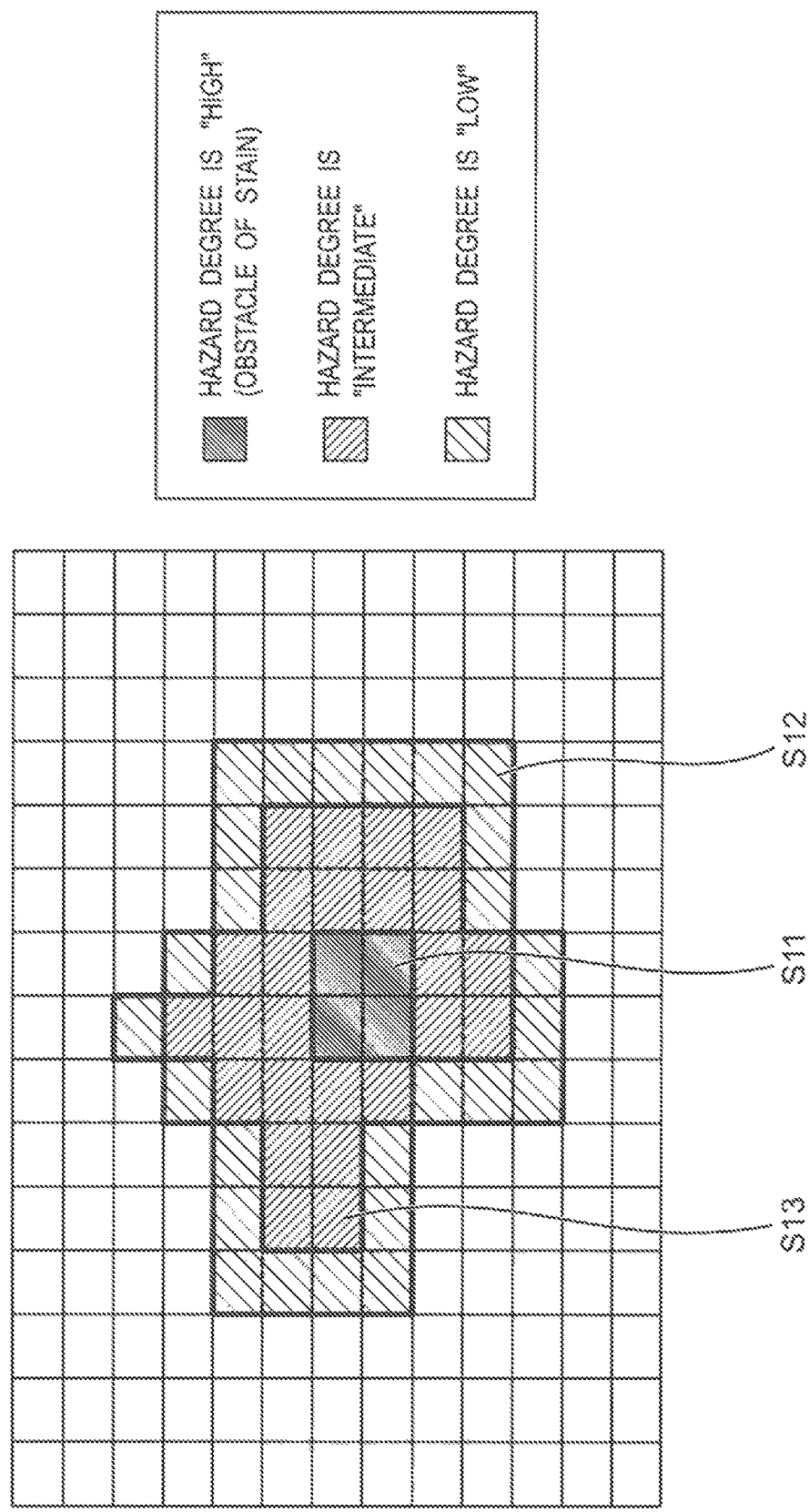
FIG. 9 is a diagram of an example of hazard degree map information.

FIG. 9 depicts an example of the hazard degree map information. As depicted in FIG. 9, the map updating part 42 estimates the hazard degree of "high" for the environment information acquired by the environment information acquiring robot 5, that is, a first hazardous area S11 having an obstacle or a stain present therein that blocks the walking of the user.

The map updating part 42 estimates a second hazardous area S12 that includes the position at which the user stops in the vicinity of the first hazardous area S11, based on the information on the intention of the user to move and the information on the mobile robot position, of the mobile robot 4. The position at which the user stops is the position at which the mobile robot 4 stops. The map updating part 42 estimates the hazard degree of "low" for the second hazardous area S12. The user mildly stops in the second hazardous area S12.

The map updating part 42 estimates the hazard degree of "intermediate" for a third hazardous area S13 present between the first hazardous area S11 and the second hazardous area S12.

The map updating part 42 updates the hazard degree map information based on the information on the estimated hazard degree. The map information (the hazard degree map information) can thereby be acquired that reflects the hazard degree of the vicinity of the hazardous area having an obstacle, a stain, or the like present therein. The mobile robot 4 can correct the walking route to which the user is guided in accordance with the hazard degree of the hazard degree map information.

An example where the congestion degree map information is updated will be described as another example of the updating of the map information. In this example, a process of updating the congestion degree map information when the information on the area having an interest target inducing interest in a person present therein is acquired as the environment information will be described.

The map updating part 42 causes the map information to reflect the interest target area that has an interest target inducing interest in a person present therein. The map updating part 42 estimates that the mobile robot 4 moves in the vicinity of the interest target area, based on the information on the mobile robot position of the mobile robot 4. The map updating part 42 estimates the congestion degree of people in the vicinity of the interest target area, based on the information of the intention of the user to move of the mobile robot 4 in the vicinity of the interest target area.

Figure 10:
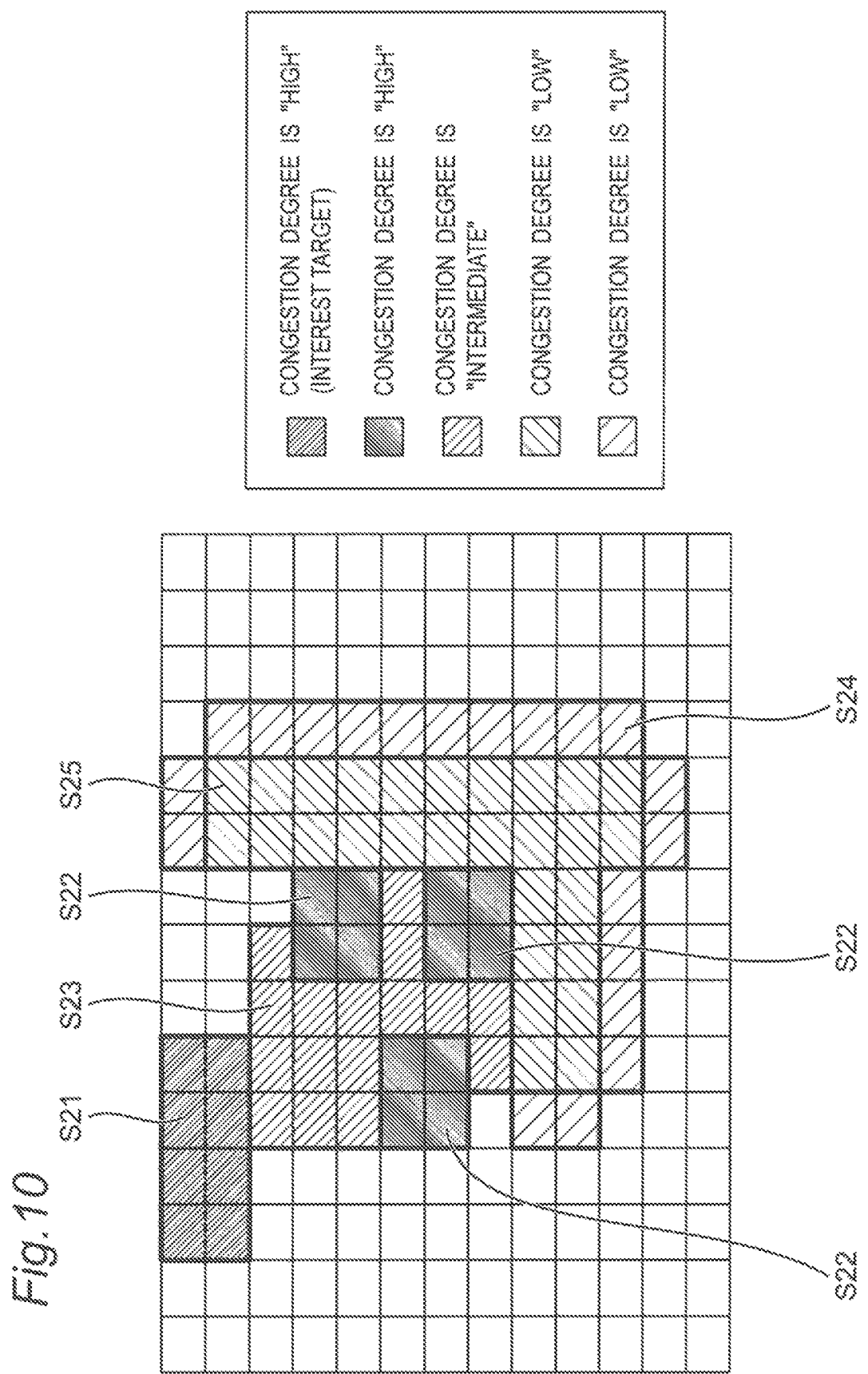
FIG. 10 is a diagram of an example of the congestion degree map information.

FIG. 10 depicts an example of the congestion degree map information. An example where three mobile robots are included will be described with reference to FIG. 10. As depicted in FIG. 10, the map updating part 42 estimates the congestion degree of "high" for the environment information acquired by the environment information acquiring robot 5, that is, an interest target area S21 having the interest target present therein.

The map updating part 42 estimates a first congestion area S22 that includes the position at which the user stops at the current time point in the vicinity of the interest target area S21, based on the information on the intention of the user to move and the information on the mobile robot position of the mobile robot 4. The map updating part 42 estimates the congestion degree of "high" for the first congestion area S22. In FIG. 10, the three first congestion areas S22 are present.

The map updating part 42 estimates the congestion degree of the vicinity of the interest target area S21 based on the information on the positions of plural users at which the users stop at the current time point, that is, the information on the plural first congestion areas S22. For example, the map updating part 42 estimates a second congestion area S23 as the area between the plural first congestion areas S22, and/or the area between the interest target area S21 and the first congestion area S22, in the vicinity of the interest target area S21, and estimates the congestion degree of "intermediate" for the second congestion area S23. The area between the plural first congestion areas S22 means the area between the multiple mobile robots 4 that stop at the current time point in the vicinity of the interest target area S21.

The map updating part 42 estimates a third congestion area S24 as the area that includes the positions at which the multiple mobile robots 4 stop in the past in the vicinity of the interest target area S21 and estimates the congestion degree of "low" for the third congestion area S24. The information on the area including the positions at which the multiple mobile robots 4 stop in the past is received from, for example, the map database 43. The user mildly stops in the third congestion area S24.

The map updating part 42 may estimate the congestion degree of "intermediate" for a fourth congestion area S25 between the first congestion area S22 and the third congestion area S24 in the vicinity of the interest target area S21.

The map updating part 42 updates the congestion degree map information based on the information on the estimated congestion degree. The map information (the congestion degree map information) can thereby be acquired that reflects the congestion degree of the vicinity of the interest target area having the interest target present therein. The mobile robot 4 can correct the walking route that guides the user, in accordance with the congestion degree of the congestion degree map information.

For the updating of the congestion degree map information to be executed when the information on the jamming area having jamming of people occurring therein is acquired as the environment information, the process may also be executed that is same as the process of updating the congestion degree map information executed when the information on the above interest target area is acquired. For example, the map updating part 42 may estimate the congestion degree of "high" for the jamming area, and may estimate the congestion degree of the area in the vicinity of the jamming area based on the intention of the user to move. In this manner, the map updating part 42 may update the congestion degree map information based on the information on the jamming area.

The above updating of each of the hazard degree map information and the congestion degree map information is exemplification and the map information is not limited to the above. The above updating of each of the hazard degree map information and the congestion degree map information has been described for the process of updating the map information based on the information on the position at which the user stops while the updating is not limited to this. For example, the map updating part 42 may update the map information based on the information on the position at which the user executes the turn operation, the position at which the user reduces the velocity, or the like. The hazard degree and the congestion degree may each be varied in accordance with, for example, the velocity reduction rate or the turn direction of the user.

FIG. 11 depicts another example of the map update table. As depicted in FIG. 11, when the user move intention estimating part 17 estimates that the user mildly stops, the map updating part 42 may update the hazard degree map information setting the hazard degree of "intermediate" for the area including the position at which the user mildly stops. When the variation amount of the handle load of $Fy^+$ that is the forward direction is reduced at an acceleration smaller than an acceleration α1, the user move intention estimating part 17 estimates that the user mildly stops. "α1" is set to be an optional value.

When the user move intention estimating part 17 estimates that the user abruptly stops, the map updating part 42 may update the hazard degree map information setting the hazard degree of "high" for the area including the position at which the user abruptly stops. When the variation amount of the handle load of $Fy^+$ that is the forward direction is reduced at an acceleration β1 or larger, the user move intention estimating part 17 estimates that the user abruptly stops. "β1" is set to be an optional value.

When the user move intention estimating part 17 estimates that the user executes the left turning motion, the map updating part 42 may update the hazard degree map information such that the hazard degree of the area in the rightward direction of the mobile robot 4 is increased. Otherwise, when the user move intention estimating part 17 estimates that the user executes the right turning motion, the map updating part 42 may update the hazard degree map information such that the hazard degree of the area in the leftward direction of the mobile robot 4 is increased.

For the congestion degree map information, the congestion degree may also be varied in accordance with the velocity reduction rate and the turn direction of the user similar to the hazard degree map information.

In the first embodiment, in addition to the above examples, for example, when the user causes the mobile robot 4 to stop at a position somewhat before the hazardous area and the intention of the user to move at the position for the stopping is abrupt stopping, the map updating part 42 may estimate that the hazard degree at the position for the mobile robot 4 to be abruptly stopped is "high". Otherwise, when the user causes the mobile robot 4 to turn in the leftward direction to avoid the interest target area or the jamming area and the intention of the user to move at the position for the turning is abrupt turning, the map updating part 42 may estimate that the congestion degree at the position at which the mobile robot 4 is caused to turn is "high". The intention of the user to move such as the abrupt stopping or the abrupt turning may be estimated based on the information on the handle load and/or the information on the rotation amounts of the rotating bodies 20.

In the example of the process for the map information updating, the process of updating the map information for the case where the user varies the move velocity and/or the move direction of the mobile robot 4 to thereby avoid the interest target area or the jamming area has been described while the process is not limited to this. The map updating part 42 may also update the map information in the case where the user does no vary the move velocity and the move direction of the mobile robot 4 and avoids the interest target area or the jamming area.

For example, an obstacle or the like unable to be detected by the environment information acquiring robot 5 may be present in the vicinity of the outer side of the walking route. Examples of the obstacle unable to be detected by the environment information acquiring robot 5 include, for example, an area having liquid spill, a broken piece, or the like present therein. In this case, the user executes the forward motion along the walking route, and can thereby avoid the hazardous area, the interest target area, or the jamming area that is present on the outer side of the walking route. The user however gazes the obstacle when the user walks in a straight line along the walking route. The user walks in a straight line while the body of the user therefore inclines in the direction in which the obstacle is present.

For example, when the obstacle unable to be detected by the environment information acquiring robot 5 is present on the left side of the walking route, the user walks in a straight line gazing the obstacle that is present on the left side of the walking route. The body of the user therefore inclines in the leftward direction to see the obstacle on the left.

The map updating part 42 may vary the hazard degree of the area on the left side of the user based on the information indicating that the body of the user inclines leftward. The information indicating that the body of the user inclines leftward is estimated based on the information on the handle load. For example, the user move intention estimating part 17 may estimate the inclination of the body of the user based on the moment of My. Otherwise, the user move intention estimating part 17 may estimate the inclination of the body of the user based on the load of Fx.

Figure 12A:
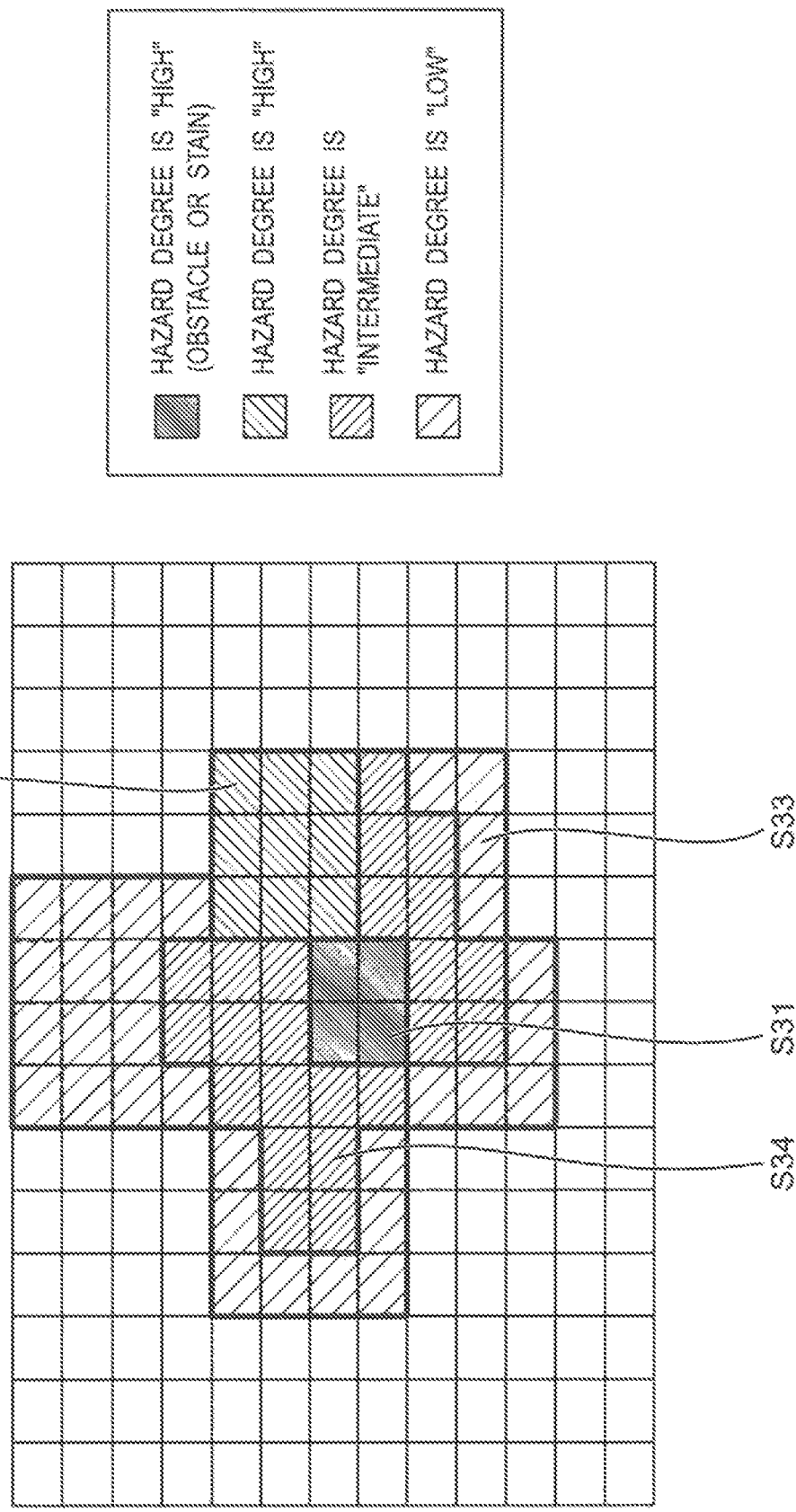
FIG. 12A is a diagram of an example of an updating process of the hazard degree map information in the case where the user varies the move velocity and/or the move direction of the mobile robot.

Another example of the updating process for the hazard degree map information will be described. FIG. 12A depicts an example of the updating process for the hazard degree map information executed when the user varies the move velocity and/or the move direction of the mobile robot 4. As depicted in FIG. 12A, the map updating part 42 estimates the hazard degree of "high" for the environment information acquired by the environment information acquiring robot 5, that is, the first hazardous area S31 having the obstacle or the stain present therein that blocks the walking of the user.

The map updating part 42 estimates the second hazardous area S32 that includes the position at which the user abruptly stops in the vicinity of the first hazardous area S31, based on the information on the intention of the user to move and the information on the mobile robot position, of the mobile robot 4.

For example, the map updating part 42 estimates the position at which the mobile robot 4 stops based on the information on the mobile robot position of the mobile robot 4. The map updating part 42 estimates the hazard degree of the second hazardous area S32 having the user abruptly stopping therein based on the information on the intention of the user to move at the position at which the mobile robot 4 stops.

The intention of the user to move at the position at which the mobile robot 4 stops is estimated by the user move intention estimating part 17. For example, the user move intention estimating part 17 estimates the abrupt stopping of the user based on the variation amount of the handle load at the position at which the mobile robot 4 stops. For example, the user move Intention estimating part 17 estimates that the user abruptly stops when the variation amount of the load of $Fy^+$ is reduced at an acceleration α2 or larger. "α2" is set to be an optional value.

The map updating part 42 estimates the hazard degree of "high" for the second hazardous area S32 having the user abruptly stopping therein.

The map updating part 42 estimates a third hazardous area S33 that includes the position at which the user mildly stops in the vicinity of the first hazardous area S31, based on the information on the intention of the user to move and the information on the mobile robot position, of the mobile robot 4.

For example, the map updating part 42 estimates the position at which the mobile robot 4 stops based on the information on the mobile robot position of the mobile robot 4. The map updating part 42 estimates the third hazardous area S33 having the user mildly stopping therein based on the information on the intention of the user to move at the position at which the mobile robot 4 stops.

The user move intention estimating part 17 estimates the mild stopping of the user based on the variation amount of the handle load at the position at which the mobile robot 4 stops. For example, when the variation amount of the load of $Fy^+$ is reduced at an acceleration smaller than an acceleration $\beta 2$, the user move intention estimating part 17 estimates that the user mildly stops. "$\beta 2$" is set to be an optional value.

The map updating part 42 estimates the hazard degree of "low" for the third hazardous area S33 having the user mildly stopping therein.

The map updating part 42 estimates the hazard degree of "intermediate" for a fourth hazardous area S34 between the first hazardous area S31 and the third hazardous area S33.

As above, the map updating part 42 can update the hazard degree map information based on the operation of avoiding the hazardous area by varying the move velocity and/or the move direction of the mobile robot 4.

The map updating part 42 will be described taking an example of the updating process for the hazard degree map information executed in the case where the hazardous area is avoided without varying the move velocity and the move direction of the mobile robot 4. The case where the hazardous area is avoided without varying the move velocity and the move direction of the mobile robot 4 means that the user does not need to intentionally vary the move velocity and the move direction of the mobile robot 4 to avoid the hazardous area. The move velocity and/or the move direction may be varied without aiming at avoiding the hazardous area, and the above does not mean that the move velocity and/or the move direction are/is not varied at all.

FIG. 12B depicts an example of the updating process for the hazard degree map information executed when the user does not vary the move velocity and the move direction of the mobile robot 4. FIG. 12B depicts an example of the process of further updating the hazard degree map information depicted in FIG. 12A. In FIG. 12B, the mobile robot 4 travels in a straight line from the left direction to the right direction (a direction D1) in the third hazardous area S33 having the hazard degree of "low" on the page face seen from above.

As depicted in FIG. 12B, the user moving the mobile robot 4 executes the straight-line travelling operation toward the direction D1. At this time, the user can avoid the first hazardous area S31 having an obstacle present therein without varying the move velocity and the move direction of the mobile robot 4.

The user move intention estimating part 17 estimates the inclination of the body of the user walking toward the direction D1 in the third hazardous area S33. For example, the user move intention estimating part 17 estimates the inclination of the body of the user based on the handle load. The information on the estimated inclination of the body of the user is transmitted to the server 3.

In the example depicted in FIG. 12B, the user move intention estimating part 17 estimates that the body of the user is inclined in the right direction relative to the travelling direction when the user guided by the mobile robot 4 walks in the third hazardous area S33. The map updating part 42 estimates the area having the user walking therein with the body thereof inclined in the right direction relative to the travelling direction in the third hazardous area S33.

The map updating part 42 estimates that an obstacle or the like unable to be detected by the environment information acquiring robot 5 is present in a fifth area S35 on the right side of the area having the user walking therein with the body thereof inclined in the right direction relative to the travelling direction. The map updating part 42 changes the hazard degree of the fifth area S35 from "low" to "intermediate".

As above, the hazard degree can be estimated based on the information on the inclination of the body of the user estimated from the handle load, and the map information capable of more safely and more comfortably guiding the user can therefore be acquired.

The above updating process for the hazard degree map information is exemplification and the updating process is not limited to this.

The map updating part 42 transmits the updated map information to the map database 43. The guide information producing part 15 changes the guide information for the user based on the updated map information. For example, the guide information producing part 15 may change the walking route in accordance with the hazard degree of the hazard degree map information.

The map database 43 is a database that has the map information stored therein. The map information stored in the map database 43 is transmitted to the multiple mobile robots 4 through the communicating part 41. The map information updated by the map updating part 42 is transmitted to the multiple mobile robots 4.

[Control for Map Information Update System]

Figure 13:
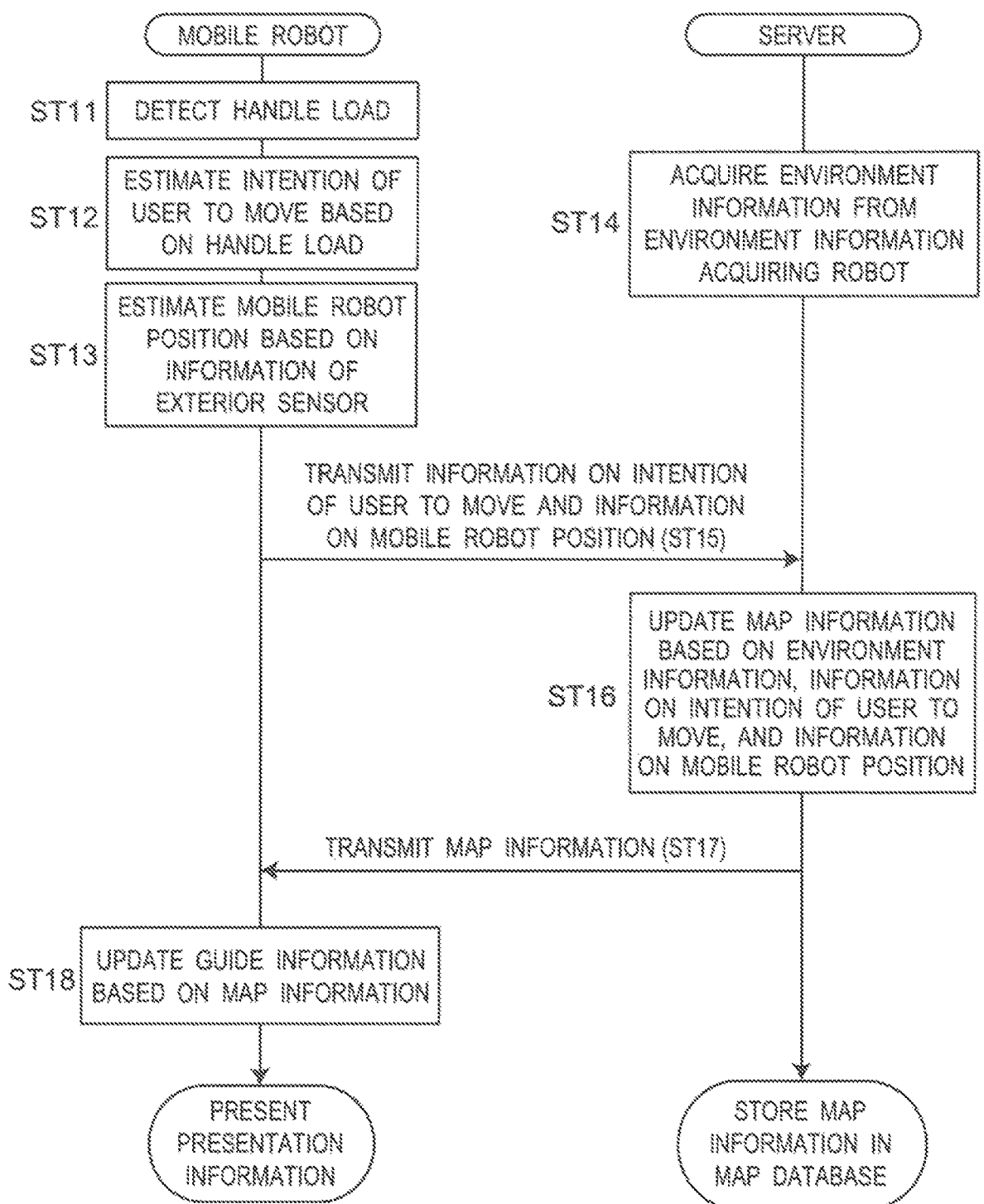
FIG. 13 is a diagram of an example of a flowchart of the map updating process in the first embodiment of this disclosure.

The control for the system 1 will be described with reference to FIG. 13. FIG. 13 depicts an example of a flowchart of the map updating process. Steps ST11 to ST13, ST15, and ST18 depicted in FIG. 13 represent the processes executed by the mobile robot 4, and steps ST14, ST16, and ST17 represent the processes executed by the server 3.

As depicted in FIG. 13, at step ST11, the detecting part 13 detects the handle load applied to the handle part 12.

At step ST12, the user move intention estimating part 17 estimates the intention of the user to move based on the handle load detected at step ST11.

At step ST13, the mobile robot position estimating part 18 estimates the mobile robot position of the mobile robot 4 based on the exterior information acquired by the exterior sensor 26.

At step ST14, the communicating part 41 of the server 3 acquires the environment information from the environment information acquiring robot 5.

At step ST15, the communicating part 19 of the mobile robot 4 transmits to the server 3 the information on the intention of the user to move estimated at step ST12 and the information on the mobile robot position of the mobile robot 4 estimated at step ST13. The information on the intention of the user to move and the information on the mobile robot position are received by the communicating part 41 of the server 3. The communicating part 41 of the server 3 further transmits the information on the intention of the user to move and the information on the mobile robot position to the map updating part 42.

At step ST16, the map updating part 42 updates the map information based on the environment information acquired at step ST14 and the information on the intention of the user to move and the information on the mobile robot position acquired at step ST15. At step ST16, for example, the map information is updated using the map update tables depicted in FIG. 8 and FIG. 11.

The map information updated at step ST16 is transmitted to the map database 43 to be stored therein.

At step ST17, the communicating part 41 of the serer 3 transmits the map information updated at step ST16 to the mobile robot 4. The updated map information is received by the communicating part 19 of the mobile robot 4. The communicating part 19 of the mobile robot 4 transmits the updated map information to the guide information producing part 15.

At step ST18, the guide information producing part 15 updates the guide information based on the map information acquired at step ST17. For example, the guide information producing part 15 may correct the walking route such that the user does not walk in the area whose hazard degree is "intermediate" in the hazard degree map information. The guide information producing part 15 may correct the walking route such that the user does not walk in the area whose hazard degree is "intermediate" in the congestion degree map information. Otherwise, the guide information producing part 15 may correct the walking route such that the user is guided to the interest target area in accordance with the taste of the user.

The updated guide information is transmitted to the presenting part 16. The presenting part 16 presents the presentation information that guides the user based on the updated guide information.

As above, in the system 1, the map information is updated based on the information on the intention of the user to move and the information on the mobile robot position, of the mobile robot 4, and the environment information. In the system 1, the guide information guiding the user is updated based on the updated map information.

[Effect]

According to the map information update system 1 of the first embodiment, the following effects are achievable.

According to the system 1, the map information can be updated based on the environment information acquired by the environment information acquiring robot 5, and the information on the intention of the user to move and the information on the mobile robot positions acquired by the multiple mobile robots 4. For example, the system 1 can cause the map information to reflect the pieces of information such as the environment information, the hazard degree map information based on the information on the intention of the user to move and the information on the mobile robot positions of the mobile robot 4, the congestion degree map information, and the comfortableness degree map information. The map information capable of safely and comfortably guiding the user can thereby be acquired.

According to the system 1, the information on the intentions of plural users to move can be imparted to the map information and the map information can therefore by updated based on the intentions of the plural users to move. For example, the system 1 can cause the map information to reflect the area having many users abruptly stopping therein in the vicinity of the area having an obstacle present therein. Otherwise, the system 1 can cause the map information to reflect the area having many users stopping therein in the vicinity of the area having an interest target present therein. For example, the multiple mobile robots 4 can thereby correct the walking route to avoid the area having many users abruptly stopping therein in the vicinity of an obstacle, based on the map information. Otherwise, the multiple mobile robots 4 can correct the walking route to avoid the area having many users stopping therein in the vicinity of an interest target, based on the map information.

According to the system 1, the map information can be updated in real time based on the pieces of information acquired by the multiple mobile robots 4 and the environment information acquiring robot 5. The map information can thereby be updated corresponding to the situation such as a temporarily arranged obstacle, a suddenly occurring stain, and temporarily generated congestion of people.

According to the system 1, the intention of the user to move is estimated based on the handle load applied to the handle part 12. The intention of the user to move thereby tends to easily be estimated and this is advantageous for updating the map information in real time.

The environment information acquiring robot 5 acquires at least one piece of information of the hazardous area that blocks the walking of the user, the interest target area having a target present therein that induces interest in a person, and the jamming area having jamming of people occurring therein, as the environment information. The map updating part 42 of the server 3 updates the map information based on the information on the intention of the user to move in the vicinity of at least one area of the hazardous area, the interest target area, and the jamming area.

The map information can be updated based on the information on the intention of the user to move in the vicinities of the hazardous area, the interest target area, and the jamming area, by the above configuration. The map information capable of more safely and more comfortably guiding the user can thereby be acquired.

The map updating part 42 of the serer 3 estimates the hazard degree of the vicinity of the hazardous area based on the information on the intention of the user to move in the vicinity of the hazardous area and updates the map information based on the information on the hazard degree.

The map information indicating the hazard degree in the area in the vicinity of the hazardous area (the hazard degree map information) can be acquired, by the above configuration. The map information capable of more safely and more comfortably guiding the user cam thereby be acquired.

The map updating part 42 of the server 3 estimates the congestion degree of the vicinity of at least one area of the interest target area and the jamming area based on the information on the intention of the user to move in the vicinity of at least one area of the interest target area and the jamming area, and updates the map information based on the information on the congestion degree.

The map information indicating the congestion degree in the area in the vicinity of the at least one area of the interest target area and the jamming area (the congestion degree map information) can be acquired, by the above configuration. The map information capable of more safely and more comfortably guiding the user can thereby be acquired. As a result, the mobile robot 4 can guide the user to the safe and comfortable walking route based on the congestion degree map information.

The map updating part 42 of the server 3 estimates the positions of the multiple mobile robots 4 based on the information on the intentions of the users to move and the information on the mobile robot positions acquired by the multiple mobile robots 4, and estimates the congestion degree based on the information on the positions of the multiple mobile robots 4.

The congestion degree of people can be estimated based on the information on the positions of the multiple mobile robots 4 by the above configuration. The congestion degree map information can thereby be more correctly updated.

In the first embodiment, the elements constituting the server 3, the mobile robot 4, and the environment information acquiring robot 5 may include, for example, a memory (not depicted) having programs stored therein that cause these elements to function and a processing circuit (not depicted) corresponding to a processor such as a central processing unit (CPU), and may function as these elements by the execution of the programs by the processor. Otherwise, the elements constituting the server 3, the mobile robot 4, and the environment information acquiring robot 5 may be constituted using an integrated circuit that causes these elements to function.

In the first embodiment, the control for the map information update system 1 has been mainly described while the control may be executed as a map information update method.

In the first embodiment, the system 1 has been described taking the example where the system 1 includes the two mobile robots 4A and 4B, and one environment information acquiring robot 5 while the configuration is not limited to this. The system 1 only has to include the two or more mobile robots 4 and one or multiple environment information acquiring robot(s) 5.

In the first embodiment, the example where the environment information acquiring robot 5 acquires the environment information has been described while the acquisition of the environment information is not limited to this. For example, the mobile robot 4 may acquire the environment information. In this case, the mobile robot 4 may include an environment information acquiring part. Otherwise, the mobile robot 4 may cause the exterior sensor 26 to function as the environment information acquiring part. The environment information tends to be acquired and the map information can more easily and more correctly be updated by the above configuration. The map information capable of more safely and more comfortably guiding the user can be acquired.

In the first embodiment, the environment information acquiring robot 5 has been described taking the example where the environment information acquiring robot 5 is a cleaning robot or a transporting robot that moves along the walking route while the environment information acquiring robot 5 is not limited to this. For example, the environment information acquiring robot 5 may be a camera or the like that is fixed to the map. Otherwise, the environment information acquiring robot 5 may be the mobile robot 4. According to this configuration, the map information capable of safely and comfortably guiding the user can be acquired.

In the first embodiment, the detecting part 13 has been described taking the example where the detecting part 13 is the hexaxial force sensor while the detecting part 13 is not limited to this. For example, a triaxial sensor, a strain sensor, or the like may be used as the detecting part 13.

In the first embodiment, the moving device 14 has been described taking the example where moving device 14 controls the rotations of the rotating bodies 20 in accordance with the handle load applied to the handle part 12 to move the mobile robot 4 while the moving device 14 is not limited to this. The moving device 14 only has to include the configuration that moves the mobile robot 4 based on the handle load applied to the handle part 12. For example, the moving device 14 may not include the actuator control part 23 and the actuator 24. The moving device 14 only has to include, for example, the rotating bodies 20.

In the first embodiment, the example has been described where the rotation amounts of the two wheels (the rotating bodies) 20 are each set and the forward motion, the backward motion, the right turning motion, the left turning motion, and the like of the mobile robot 4 are thereby controlled while the control is not limited to this. For example, the rotation amounts of the wheels 20 may each be controlled using a braking mechanism or the like, and the operations of the mobile robot 4 may thereby be controlled.

In the first embodiment, the presenting part 16 has been described taking the example where the presenting part 16 includes the speaker and/or the display while the presenting part 16 is not limited to this. For example, the presenting part 16 may present the presentation information in the surrounding environment using a projector.

The presentation information has been described taking the example where the presentation information is the information such as the sound, the image, and/or the video image that guide(s) the user along the walking route while the presentation information is not limited to this. For example, the presentation information may be a light beam emitted in the guide direction, a pointing device that points the guide direction, or the like.

The presenting part 16 may present information that notifies the user of the completion of the updating of the map information when the updating of the map information is completed. The information that notifies the user of the updating of the map information may be, for example, a sound, an image, a video image, a light beam, and/or the like. The user can be notified of the completion of the updating of the map information by the above configuration.

In the first embodiment, the mobile robot 4 has been described taking the example where the mobile robot position is estimated by the mobile robot position estimating part 18 while the estimation of the mobile robot position is not limited to this. The mobile robot position of the mobile robot 4 may be estimated by being detected by the exterior sensor 26 of another mobile robot 4 or by being detected by the environment information acquiring robot 5.

In the first embodiment, the mobile robot 4 has been described taking the example where the mobile robot 4 includes the interaction part 25 while the mobile robot 4 is not limited to this. The interaction part 25 is not an essential configuration in the mobile robot 4.

In the first embodiment, the mobile robot 4 has been described taking the example where the mobile robot 4 includes the exterior sensor 26 while the mobile robot 4 is not limited to this. The exterior sensor 26 is not an essential configuration in the mobile robot 4. For example, the position information on the mobile robot 4 may be acquired by the environment information acquiring robot 5 or may be acquired by another mobile robot 4.

In the first embodiment, the server 3 has been described taking the example where the server 3 includes the map database 43 while the server 3 is not limited to this. The map database 43 may be included in a device other than the server 3.

In the first embodiment, the map updating part 42 has been described taking the example where the map updating part 42 updates the map information based on the information on the intention of the user to move and the information on the mobile robot positions that are acquired by the multiple mobile robots 4, and the environment information acquired by the environment information acquiring robot 5 while the updating is not limited to this. For example, the map updating part 42 may update the map information based on the information on the intention of the user to move and the information on the mobile robot positions that are acquired by the multiple mobile robots 4 without using the environment information.

For example, in an area having the multiple mobile robots 4 often abruptly stopping or abruptly turning therein, the map updating part 42 may estimate that this area is a hazardous area and may vary the hazard degree thereof. The system 1 can learn the hazardous area and the like that cannot be detected by the environment information acquiring robot 5 by the above configuration. The map information capable of more safely and more comfortably guiding the user can thereby be acquired.

In the first embodiment, an example of the updating process for the map information has been described for the case where the environment information acquiring robot 5 acquires the environment information such as the hazardous area, the interest target area, and the jamming area while the updating process is not limited to this. For example, when the hazardous area, the interest target area, and the jamming area disappear and the environment information acquiring robot 5 does not detect these pieces of environment information, the map updating part 42 may update the map information. For example, when the hazardous area, the interest target area, or the jamming area is not detected, the map updating part 42 may delete the pieces of information on these areas from the map information. The hazardous area, the interest target area, and the jamming area can be updated in real time by the above configuration. The hazard degree, the congestion degree, and the like of the area in the vicinity of each of these areas can be reduced. The map information capable of more safely and more comfortably guiding the user can thereby be acquired.

Second Embodiment

A map information update system according to the second embodiment of this disclosure will foe described. In the second embodiment, the points different from the first embodiment will be mainly described. In the second embodiment, the same or equivalent configurations as/to those of the first embodiment will be described being given the same reference numerals. In the second embodiment, any description redundant for that of the first embodiment will not be made.

The second embodiment differs from the first embodiment in the point that the mobile robot includes a load tendency data producing part and a load correcting part. For example, the second embodiment differs from the first embodiment in the point that the handle load is corrected based on the load tendency data of the user.

[Mobile Robot]

Figure 14:
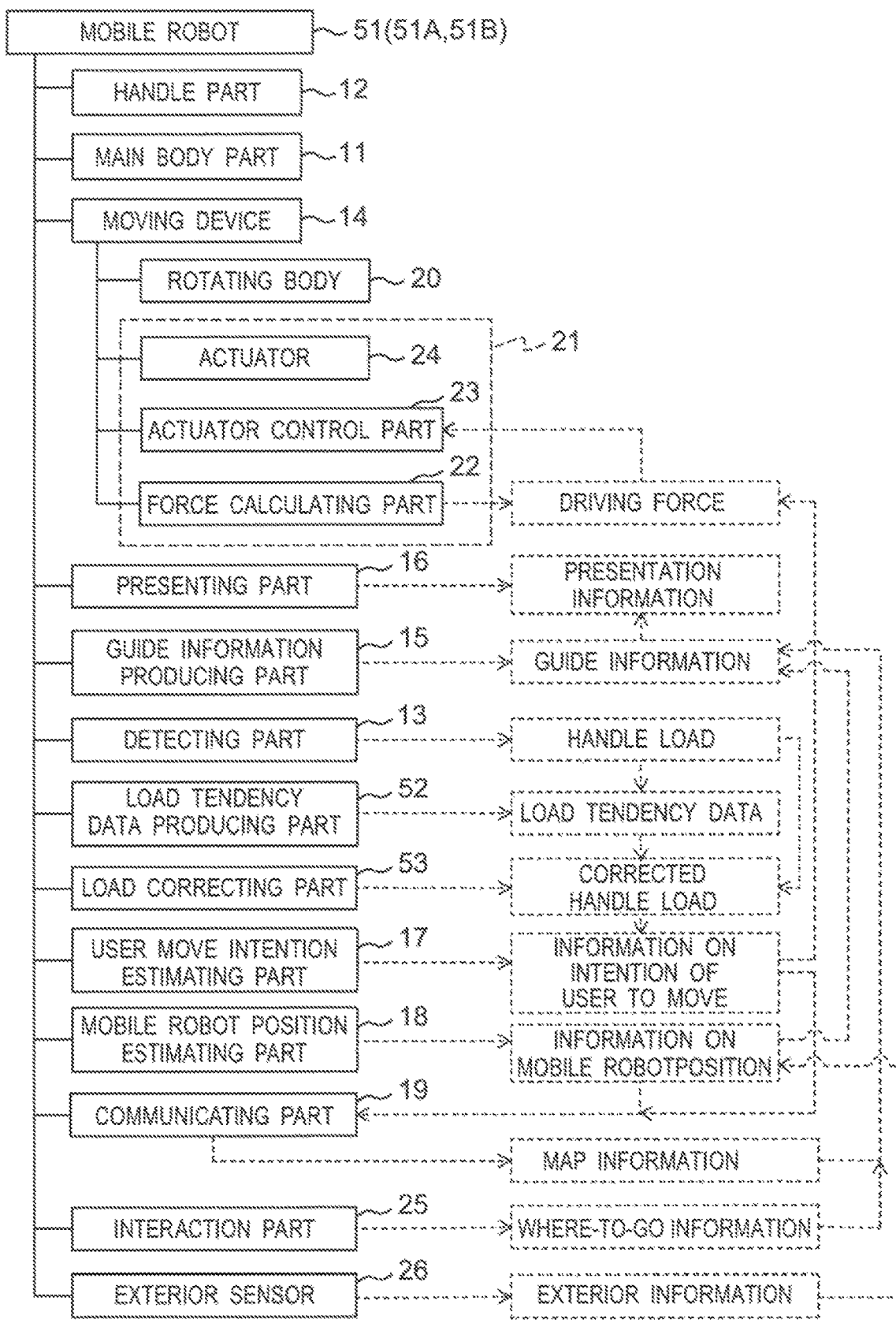
FIG. 14 is a control block diagram of an example of the control configuration of a mobile robot in a second embodiment of this disclosure.
Figure 15:
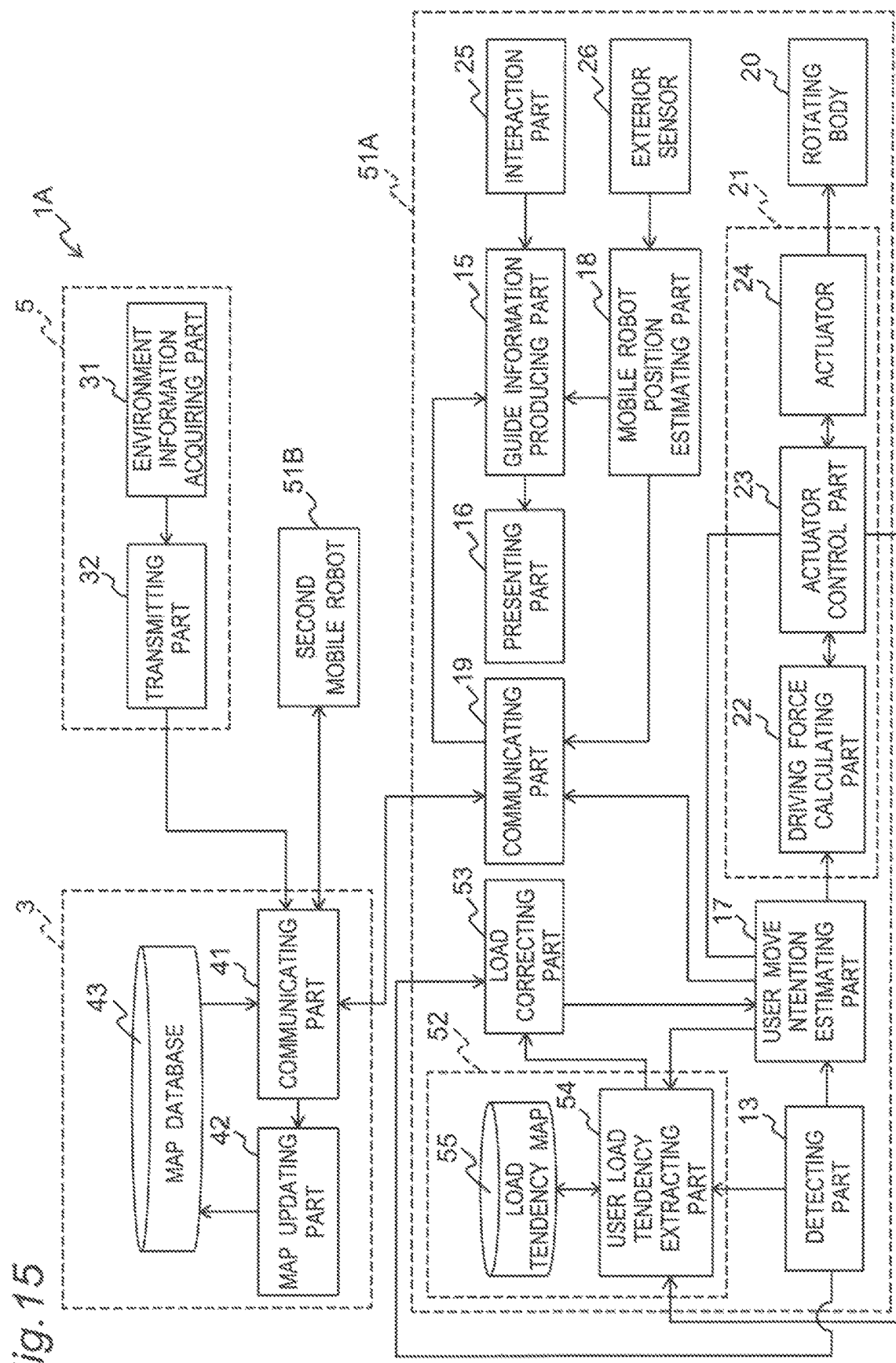
FIG. 15 is a control block diagram of an example of the mina control configuration of a map information update system according to the second embodiment of this disclosure.

FIG. 14 depicts a control block diagram of an example of the control configuration of each of a mobile robots 51 in the second embodiment. FIG. 15 is a control block diagram of an example of the main control configuration of a map information update system 1A (hereinafter, referred to as "system 1A") according to the second embodiment. In FIG. 15, a second mobile robot 51B has the same control configuration as that of a first mobile robot 51A and the control configuration of the second mobile robot 51B is not depicted.

As depicted in FIG. 14 and FIG. 15, the mobile robots 51 each include a load tendency data producing part 52 that produces load tendency data, and a load correcting part 53 that corrects the handle load based on the load tendency data.

The load tendency data producing part 52 produces the load tendency data that indicates the tendency of the handle load applied to the handle part 12 based on the load data applied to the handle part 12 acquired during the move of the mobile robot 51. For example, the load tendency data producing part 52 produces the load tendency data of the user based on the information on the handle load detected by the detecting part 13 during the move of the mobile robot 51.

The load tendency data is the data indicating the tendency of the handle load of the user in a predetermined operation. The predetermined operation means, for example, the straight-line travelling operation, the backward motion, and the turn operation. The load tendency data may be, for example, the fluctuation frequency of the handle load detected when the user walks. Otherwise, the load tendency data may be the bias of the walking of the user.

For example, when the user who walks being biased to the left, holds the handle part 12, the handle load in the leftward direction, that is, the moment of $My^+$ tends to be increased even though the user executes the forward motion. The load tendency data producing part 52 may produce the bias of the handle load applied to the handle part 12 during the walking of the user, as the load tendency data.

The load tendency data producing part 52 includes a user load tendency extracting part 54 that extracts the load tendency of the user corresponding to the move direction of the user, and a load tendency map 55 that has the load tendency data of the user stored therein.

The user load tendency extracting part 54 extracts the load tendency of the user that corresponds to the move direction of the user. For example, the user load tendency extracting part 54 extracts the load tendency data of the user that corresponds to the move direction of the user, from the load tendency map 55. For example, when the user executes the straight-line travelling operation (the forward travelling in the forward direction), the user load tendency extracting part 54 extracts the load tendency of the user that corresponds to the straight-line travelling operation, from the load tendency map 55. The user load tendency extracting part 54 transmits the load tendency data extracted from the load tendency map 55, to the load correcting part 53.

The user load tendency extracting part 54 acquires the information on the handle load from the detecting part 13, and acquires the information on the rotation amounts of the wheels 20 from the actuator control part 23. The user load tendency extracting part 54 produces the load tendency data of the user based on the information on the handle load detected by the detecting part 13 and the information on the rotation amounts of the wheels 20 acquired by the actuator control part 23. For example, the user load tendency extracting part 54 estimates the move direction of the user based on the information on the rotation amounts of the wheels 20. The user load tendency extracting part 54 extracts the estimated load tendency for each of the move directions of the user based on the information on the handle load.

For example, the user load tendency extracting part 54 estimates that the move direction of the user is the forward direction based on the information on the rotation amounts of the wheels 20. When the moment of $My^+$ is increased, of the handle load of the user moving in the forward direction, the user load tendency extracting part 54 estimates that the load tendency of the user in the forward direction is biased to the left. In this manner, the user load tendency extracting part 54 produces the load tendency data of the user for each of the move directions, based on the information on the handle load and the information on the rotation amounts of the wheels 20. The produced load tendency data is transmitted to the load tendency map 55.

The load tendency map 55 is a database that has the load tendency data of the user stored therein for each of the move directions of the user. The load tendency map 55 has the load tendency data of the user for each of the move directions stored therein. The load tendency map 55 has, for example, the fluctuation frequency in the move direction during the walking, the bias of the walking, and the like stored therein as the load tendency data of the user. The load tendency map 24 may have data of the fluctuation frequency and data of the bias of the walking that are calculated in the past stored therein. The load tendency map 24 may have data such as those on the use place and the use time period of the mobile robot 4, the physical condition of the user, and the like stored therein. These pieces of data may be used when the load correcting part 53 corrects the handle load.

The load correcting part 53 corrects the handle load detected by the detecting part 13, based on the load tendency of the user. For example, the load correcting part 53 corrects the value of the handle load detected by the detecting part 13 based on the load tendency data produced by the load tendency data producing part 52.

As depicted in FIG. 15, in the first mobile robot 51A, the load correcting part 53 acquires the information on the handle load from the detecting part 13, and acquires the load tendency data of the user from the user load tendency extracting part 54. The load correcting part 53 corrects the handle load based on the information on the handle load and the load tendency data of the user. For example, the fluctuation frequency may be calculated from the handle load data in the past during the walking of the user, and the fluctuation frequency may be filtered from the handle load detected by the detecting part 13, as the correction of the handle load. The load tendency data of the user can be acquired in a wide range from the fluctuation whose protrusions and recesses are small to the fluctuation whose protrusions and recesses are large indicated by the waveform information of the handle load, and the handle load can thereby be corrected, by using the fluctuation frequency.

The information on the corrected handle load is transmitted to the user move intention estimating part 17. The user move intention estimating part 17 estimates the intention of the user to move based on the information on the corrected handle load.

[Control for Map Information Update System]

Figure 16:
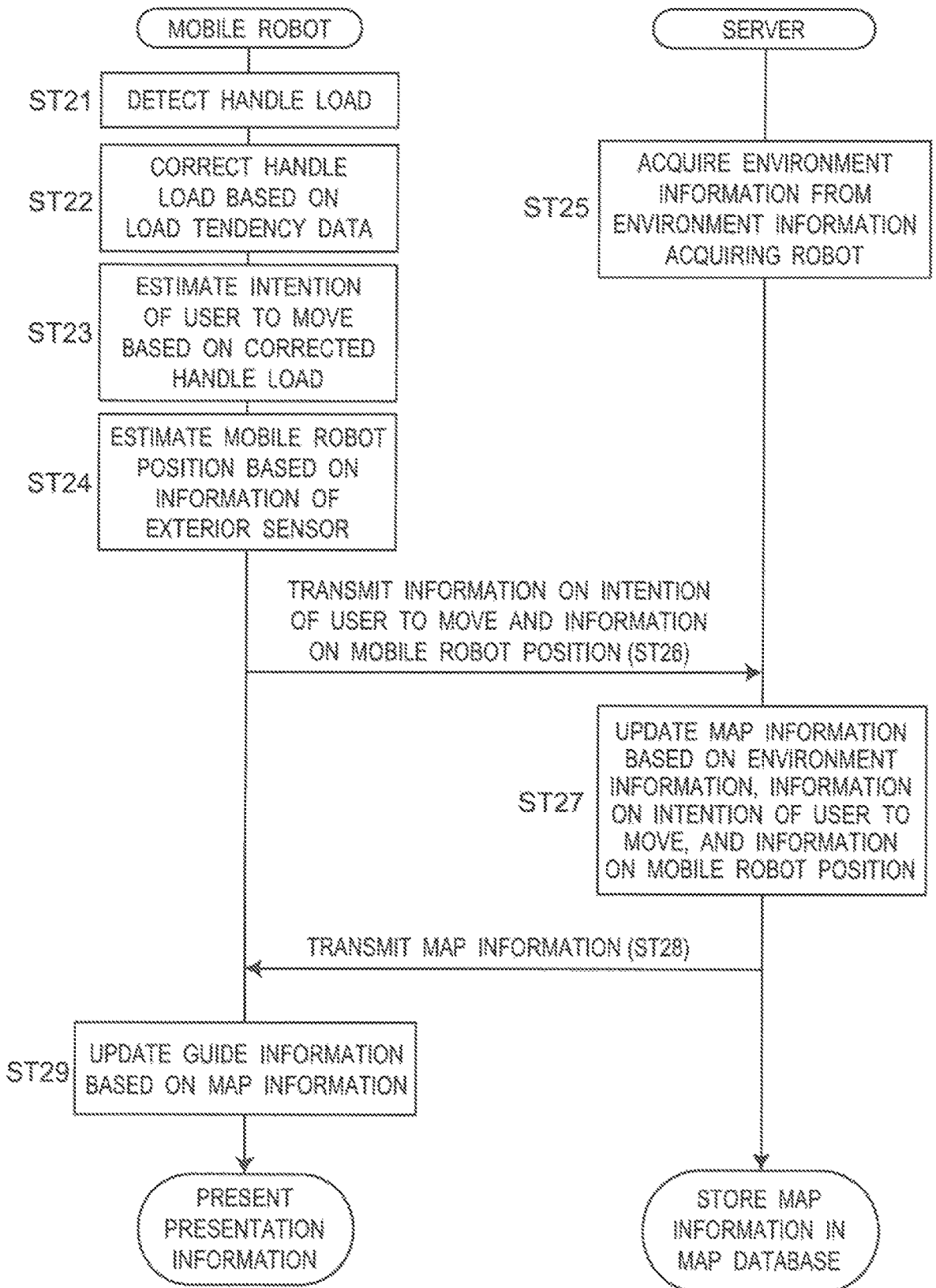
FIG. 16 is a diagram of an example of a flowchart of a map updating process in the second embodiment of this closure.

The control for the system 1A will be described with reference to FIG. 16. FIG. 16 depicts an example of a flowchart of the map updating process. Steps ST21 to ST24, ST26, and ST29 depicted in FIG. 16 represent the processes executed by the mobile robot 51 and steps ST25, ST27, and ST28 represent the processes executed by the server 3.

As depicted in FIG. 16, at step ST21, the detecting part 13 detects the handle load applied to the handle part 12. The information on the handle load detected by the detecting part 13 is transmitted to the load correcting part 53.

At step ST22, the load correcting part 53 corrects the handle load based on the information on the handle load acquired at step S21 and the load tendency data of the user.

At step ST23, the user move intention estimating part 17 estimates the intention of the user to move based on the handle load corrected at step ST12.

At step ST24, the mobile robot position estimating part 18 estimates the mobile robot position of the mobile robot 51 based on the exterior information acquired by the exterior sensor 26.

At step ST25, the communicating part 41 of the server 3 acquires the environment information from the environment information acquiring robot 5.

At step ST26, the communicating part 19 of the mobile robot 51 transmits the information on the intention of the user to move estimated at step ST22, and the information on the mobile robot position of the mobile robot 4 estimated at step ST24, to the server 3. The information on the intention of the user to move and the information on the mobile robot position are received by the communicating part 41 of the server 3. The communicating part 41 of the server 3 transmits the information on the intention of the user to move and the information on the mobile robot position, to the map updating part 42.

At step ST27, the map updating part 42 updates the map information based on the environment information acquired at step ST25, and the information on the intention of the user to move and the information on the mobile robot position that are acquired at step ST26.

The map information updated at step ST27 is transmitted to the map database 43 to be stored therein.

At step ST28, the communicating part 41 of the server 3 transmits the map information updated at step ST27 to the mobile robot 51. The updated map information is received by the communicating part 19 of the mobile robot 51. The communicating part 19 of the mobile robot 51 transmits the updated map information to the guide information producing part 15.

At step ST29, the guide information producing part 15 updates the guide information based on the map information acquired at step ST29.

The updated guide information is transmitted to the presenting part 16. The presenting part 16 presents the presentation information that guides the user, based on the updated guide information.

In this manner, in the system 1A, the handle load is corrected based on the load tendency data of the user, and the intention of the user to move is estimated based on the corrected handle load. In the system 1A, the intention of the user to move estimated based on the corrected handle load is used in the updating process for the map information.

[Effects]

According to the map information update system 1A of the first embodiment, the following effects are achievable.

According to the system 1A, the value of the handle load can be corrected based on the load tendency data of the user. The system 1A can correct the value of the handle load in accordance with the tendency of the user, by the above configuration.

For example, for a user who tends to walk swinging to the right and the left, the value of the handle load is corrected by cutting the frequency of the fluctuation caused by the swinging to the right and the left from the handle load. In this manner, the value of the handle load can be corrected in accordance with the physical capacity of the user.

The intention of the user to move can thereby be more correctly estimated based on the corrected handle load, and the map information capable of more safely and more comfortably guiding the user can thereby be acquired.

This disclosure has been descried in a degree of detail with reference to the embodiments while the content of the disclosure of the embodiments may naturally be changed in their detailed portions. Any changes made to each of the combinations of the elements and orders thereof in each of the embodiments may be realized without departing from the scope and the gist of this disclosure.

This disclosure is beneficial to a system that guides a user to a walking route using a mobile robot because the map information capable of safely and comfortably guiding the user can be acquired. This disclosure is also beneficial to a system that includes a transporting robot, a cleaning robot, and the like in addition to the mobile robot. This disclosure is applicable to various systems such as a recommendation system.

EXPLANATIONS OF LETTERS OR NUMBERS 1, 1A map information update system
2 robot
3 server
4, 4A, 4B mobile robot
5 environment information acquiring robot
11 main body part
12 handle part
13 detecting part
14 moving device
15 guide information producing part
16 presenting part
17 user move intention estimating part
18 mobile robot position estimating part
19 communicating part
20 rotating body
21 driving part
22 driving force calculating part
23 actuator control part
24 actuator
25 interaction part
26 exterior sensor
31 environment information acquiring part
32 transmitting part
41 communicating part
42 map updating part
43 map database
51, 51A, 51B mobile robot
52 load tendency data producing part
53 load correcting part
54 user load tendency extracting part
55 load tendency map

The invention claimed is:

1. A map information update system that updates map information based on information acquired using multiple robots, the map information update system comprising:
multiple mobile robots that each guide a user for the user to walk along an optional walking route, the multiple mobile robots each acquiring information on an intention of the user to move and information on a position of the mobile robot;
one or multiple environment information acquiring robot(s) that each acquire(s) environment information of a map; and
a server that updates the map information based on the information on the intention of the user to move and the information on the mobile robot position that are acquired by the multiple mobile robots and the environment information that is acquired by the one or multiple environment information acquiring robot(s), wherein
each of the multiple mobile robots comprises:
memory storing programs;
a main body part;
a handle part that is disposed on the main body part, the handle part being able to be held by the user;
a force sensor detecting a handle load applied to the handle part, wherein the handle load indicates an intention to move in a direction and at a velocity based on a magnitude and direction of forces detected by the force sensor in the x, y, and z axes relative to the force sensor and moments about the x, y, and z axes relative to the force sensor;
a rotating body for moving the main body part; and
a motor for driving the rotating body to cause the rotating body to move the mobile robot based on the handle load applied to the handle part;
wherein one or more of the multiple mobile robots include a guide information producing part, a presenting part, a user move intention estimating part, a mobile robot position estimating part and a communicating part, wherein:
the guide information producing part producing guide information to guide the user to the walking route based on the map information;
the presenting part presenting presentation information to guide the user based on the guide information;
the user move intention estimating part estimating the intention of the user to move based on the handle load;
the mobile robot position estimating part estimating the mobile robot position of the mobile robot; and
the communicating part transmitting the information on the intention of the user to move and the information on the mobile robot position, to the server, and receiving the map information from the server.

2. The map information update system according to claim 1, wherein
the one or multiple environment information acquiring robot(s) acquire(s) at least one piece of information of those on a hazardous area that blocks the walking of the user, an interest target area having a target present therein that induces interest in a person, and a jamming area having jamming of people occurring therein, as the environment information, and wherein
the server updates the map information based on information on the intention of the user to move in a vicinity of at least one area of the hazardous area, the interest target area, and the jamming area.

3. The map information update system according to claim 2, wherein
the server estimates a hazard degree of a vicinity of the hazardous area based on the information on the intention of the user to move in the vicinity of the hazardous area, and
updates the map information based on information on the hazard degree.

4. The map information update system according to claim 2, wherein
the server estimates a congestion degree of a vicinity of at least one area of the interest target area and the jamming area based on the information on the intention of the user to move in the vicinity of at least the one area of the interest target area and the jamming area, and
updates the map information based on the information on the congestion degree.

5. The map information update system according to claim 4, wherein the server
estimates positions of the multiple mobile robots based on the information on the intentions of the user to move and the information on the mobile robot positions that are acquired by the multiple mobile robots, and
estimates the congestion degree based on the information on the positions of the multiple mobile robots.

6. The map information update system according to claim 1, wherein
the one or more of the multiple mobile robots further including:
a load tendency data producing part that produces load tendency data indicating a tendency of the handle load applied to the handle part based on the handle load applied to the handle part acquired during a move of the mobile robot, and a load correcting part that corrects the handle load based on the load tendency data, and wherein the user move intention estimating part estimates the intention of the user to move based on the handle load corrected by the load correcting part.

7. The map information update system according to claim 1, wherein each of the multiple mobile robots comprises a sensor for acquiring the environment information, and wherein the server updates the map information based on the pieces of environment information acquired by the sensors of the multiple mobile robots.

8. The map information update system according to claim 1, wherein the one or multiple environment information acquiring robot(s) comprise(s) the mobile robot(s).

9. The map information update system according to claim 1, wherein when the map information is updated, the multiple mobile robots each present information that notifies the user of the fact that the map information is updated.

10. The map information update system according to claim 1, wherein the user move intention estimating part estimates the intention of the user to move based on information on a rotation amount of the rotating body.

11. A mobile robot that guides a user to a walking route, the mobile robot comprising:

memory for storing a program;

a main body part;

a handle part that is disposed on the main body part, the handle part being able to be held by the user;

a force sensor detecting a handle load applied to the handle part, wherein the handle load indicates an intention to move in a direction and at a velocity based on a magnitude and direction of forces detected by the force sensor in the x, y, and z axes relative to the force sensor and moments about the x, y, and z axes relative to the force sensor;

a rotating body for moving the main body part; and a motor for driving the rotating body to cause the rotating body to move the mobile robot based on the handle load applied to the handle part;

wherein the mobile robot includes a guide information producing part, a presenting part, a user move intention estimating part, a mobile robot position estimating part and a communicating part, wherein:

the guide information producing part produces guide information guiding the user to the walking route based on map information;

the presenting part present presentation information to guide the user based on the guide information;

the user move intention estimating part estimates an intention of the user to move based on the handle load;

the mobile robot position estimating part estimates a mobile robot position of the mobile robot;

the communicating part transmits information on the intention of the user to move and information on the mobile robot position to a server, the mobile robot receiving the map information;

the communicating part receives from the server the map information that is updated based on the information on the intention of the user to move and the information on the mobile robot position, and environment information of a map; and the presenting part presents the updated map information to guide the user to the walking route based on the updated map information.

12. The mobile robot according to claim 11, further including:

a load tendency data producing part that produces load tendency data indicating a tendency of the handle load applied to the handle part based on the handle load applied to the handle part acquired during a move of the mobile robot, a load correcting part that corrects the handle load based on the load tendency data, and the user move intention estimating part estimates the intention of the user to move based on the handle load corrected by the load correcting part.

13. The mobile robot according to claim 11, further comprising:

a sensor for acquiring the environment information, and wherein the communicating part transmits the environment information acquired by the sensor, to a server.

14. The mobile robot according to claim 11, wherein when the map information is updated, the mobile robot presents information that notifies the user of the fact that the map information is updated.

15. The mobile robot according to claim 11, wherein the user move intention estimating part estimates the intention of the user to move based on information on a rotation amount of the rotating body.

* * * * *